US012118365B2

(12) United States Patent
Bohdan et al.

(10) Patent No.: US 12,118,365 B2
(45) Date of Patent: *Oct. 15, 2024

(54) SYSTEM AND METHOD FOR DEVICE INTEROPERABILITY AND SYNCHRONIZATION

(71) Applicant: SIMPLEWAY TECHNOLOGIES LTD., Dublin (IE)

(72) Inventors: Artem Bohdan, Berlin (DE); Ievgen Krutov, Kryvyi Rih (UA)

(73) Assignee: SIMPLEWAY TECHNOLOGIES LTD., Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/132,828

(22) Filed: Apr. 10, 2023

(65) Prior Publication Data

US 2024/0078117 A1    Mar. 7, 2024

Related U.S. Application Data

(63) Continuation of application No. 17/318,113, filed on May 12, 2021, now Pat. No. 11,650,828, which is a
(Continued)

(51) Int. Cl.
*G06F 9/44* (2018.01)
*G06F 9/4401* (2018.01)
(Continued)

(52) U.S. Cl.
CPC .......... *G06F 9/4406* (2013.01); *G06F 9/4403* (2013.01); *G06F 9/4411* (2013.01);
(Continued)

(58) Field of Classification Search
CPC ............................ G06F 9/4406; G06F 9/4416
See application file for complete search history.

(56) References Cited

U.S. PATENT DOCUMENTS

| 6,532,538 B1 | 3/2003 | Cronk |
| 8,954,805 B2 | 2/2015 | Liu |

(Continued)

FOREIGN PATENT DOCUMENTS

| EP | 1808763 A1 | 7/2007 |
| EP | 2753047 A1 | 7/2014 |

(Continued)

OTHER PUBLICATIONS

US 9,516,090 B2, 12/2016, Koo (withdrawn)
(Continued)

*Primary Examiner* — Stefan Stoynov
(74) *Attorney, Agent, or Firm* — Ice Miller LLP; Justin D. Swindells

(57) ABSTRACT

A device interoperability system for one or more user devices associated with a user, wherein said one or more user devices comprises a first user device, said device interoperability system comprising a communications module, wherein a first connection is established between said first user device and said communications module; storage associated with said device interoperability system and coupled to said communications module, wherein said storage stores an operating system, one or more programs, and data associated with the user, further wherein said operating system is booted by said first user device via said first connection; and one or more processors to support said device interoperability system.

20 Claims, 22 Drawing Sheets

Related U.S. Application Data continuation of application No. 16/395,478, filed on Apr. 26, 2019, now Pat. No. 11,048,520, which is a continuation-in-part of application No. PCT/IB2017/056516, filed on Oct. 19, 2017.

(60) Provisional application No. 62/413,169, filed on Oct. 26, 2016.

(51) Int. Cl.
  *G06F 9/455* (2018.01)
  *G06F 9/54* (2006.01)
  *H04L 69/24* (2022.01)

(52) U.S. Cl.
  CPC ............ *G06F 9/4416* (2013.01); *G06F 9/455* (2013.01); *G06F 9/54* (2013.01); *H04L 69/24* (2013.01)

(56) References Cited

U.S. PATENT DOCUMENTS

| | | | |
|---|---|---|---|
| 9,282,168 | B2 | 3/2016 | Prahlad |
| 9,450,874 | B2 | 9/2016 | Zhang |
| 9,501,666 | B2 | 11/2016 | Lockett |
| 10,180,846 | B2 | 1/2019 | Bohdan |
| 2006/0150239 | A1 | 7/2006 | Fujimori |
| 2007/0174404 | A1 | 7/2007 | Song |
| 2007/0174414 | A1 | 7/2007 | Song |
| 2009/0019276 | A1 | 1/2009 | Song |
| 2009/0019277 | A1 | 1/2009 | Song |
| 2009/0216866 | A1 | 8/2009 | Lu |
| 2009/0300020 | A1 | 12/2009 | Chen |
| 2012/0084481 | A1 | 4/2012 | Reeves |
| 2012/0272095 | A1 | 10/2012 | Liu |
| 2013/0117502 | A1 | 5/2013 | Son |
| 2013/0144939 | A1 | 6/2013 | Prahlad |
| 2014/0036767 | A1 | 2/2014 | Perugupalli |
| 2014/0089526 | A1 | 3/2014 | Schmidt |
| 2014/0191579 | A1 | 7/2014 | Szu |
| 2014/0317242 | A1 | 10/2014 | Koo |
| 2016/0142891 | A1 | 5/2016 | Virhia |
| 2016/0156682 | A1 | 6/2016 | Jeon |
| 2017/0339251 | A1 | 11/2017 | Jagannath |
| 2018/0102916 | A1 | 4/2018 | Chen |

FOREIGN PATENT DOCUMENTS

| | | |
|---|---|---|
| EP | 3040869 A1 | 7/2016 |
| JP | 2006-099234 A | 4/2006 |
| JP | 2007-525756 A | 9/2007 |
| JP | 2014-135881 A | 7/2014 |
| KR | 2016-0048763 A | 5/2014 |
| WO | WO 2010/063985 A1 | 6/2010 |
| WO | WO 2014/210172 A2 | 12/2014 |

OTHER PUBLICATIONS

International Search Report and Written Opinion of International Searching Authority for Application No. PCT/IB2017/056516, mailed Feb. 9, 2018 (11 pages).
Samsung Electronics; "Samsung Raises the Bar with Galaxy S10: More Screen, Cameras and Choices"; retrieved from https://news.samsung.com/global/samsung-raises-the-bar-with-galaxy-s10-more-screen-cameras-and-choices; Feb. 21, 2019 (16 pages).
"Using Google Drive—New Features, Benefits & Advantages of Google Cloud Storage"; retrieved from https://www.google.com/Intl/en_US/drive/using-drive/ on Dec. 16, 2019 (4 pages).
"Dropbox"; retrieved from https://www.dropbox.com on Dec. 16, 2019 (6 pages).
"ICloud: The best place for all your photos, files and more"; retrieved from https://www.apple.com/ca/icloud/ on Dec. 16, 2019 (15 pages).
"Resilio: Connecting Massive Data Flows"; retrieved from https://www.resilio.com/ on Dec. 16, 2019 (9 pages).
"Librevault: File synchronization designed with privacy in mind"; retrieved from https://librevault.com/ on Dec. 16, 2019 (2 pages).
"Tonido—Run Your Personal Cloud. A Free Private Cloud Server"; retrieved from https://www.tonido.com/ on Dec. 16, 2019 (5 pages).
"ASUS PadFone X (US)"; retrieved from https://www.asus.com/us/Phone/ASUS_PadFone_X_US/ on Dec. 16, 2019 (6 pages).
"HP Elite x3: The one device that's every device"; retrieved from https://www8.hp.com/ca/en/ads/elitex3/overview.html on Dec. 16, 2019 (10 pages).
"Fuchsia is not Linux"; retrieved from https://fuchsia.dev/fuchsia-src/concepts on Dec. 16, 2019 (4 pages).
"RSA Data Privacy & Security Survey 2019: The Growing Data Disconnect"; retrieved from https://www.rsa.com/content/dam/en/misc/rsa-data-privacy-and-security-survey-2019.pdf; publication date unknown (16 pages).
"Samsung Raises the Bar with Galaxy S10: More Screen, Cameras and Choices"; retrieved from https://news.samsung.com/global/samsung-raises-the-bar-with-galaxy-s10-more-screen-cameras-and-choices on Dec. 16, 2019; Feb. 21, 2019 (14 pages).
"Zion | Exodus"; retrieved from https://www.htcexodus.com/eu/zion/, on Dec. 16, 2019; copyright 2011-2019 (3 pages).
"Blockchain Phone | Sirin Phone"; retrieved from https://shop.sirinlabs.com/, on Dec. 16, 2019 (7 pages).
"VaultTel"; retrieved from https://vaulttel.net/, on Dec. 16, 2019 (2 pages).
"Librevault features overview"; May 22, 2016; retrieved from https://librevault.com/blog/features/, on Dec. 16, 2019 (2 pages).
European Patent Office, Examination Report for European Patent Application No. 17805258.5, dated Oct. 14, 2021 (10 pages).
Caceres, R. et al.; "Reincarnating pcs with portable soulpads"; Proceedings of the 3rd International Conference on Mobile Systems, Applications, and Services; Jun. 6, 2005 (pp. 65-78); ACM, New York, NY 10121-0701.
"Booting—Wikipedia"; Jun. 2, 2001; retrieved from https://en.wikipedia.org/w/index.php?.
"Live USB—Wikipedia": May 19, 2001; retrieved from https://en.wikipedia.org/w/index.php?.
European Patent Office, "Written Opinion of the International Searching Authority" for PCT/IB2022/055501, mailed Sep. 30, 2022.
European Patent Office; "International Search Report" for PCT/IB2022/055501, mailed Sep. 30, 2022.
"Soulpad—Wikipedia"; May 15, 2016; retrieved from https://en.wikipedia.org/w/index.php (3 pages).
Singer, M.; "IBM brains capture a PC's soul"; CNET, Aug. 12, 2005; retrieved from https://www.cnet.com/culture/ibm-brains-capture-a-pcs-soul (3 pages).
Raghunath, M. et al.; "Reincarnating pcs with portable soulpads"; in IBM Research Division, Thomas J. Watson Research Center, Nov. 8, 2004 (15 pages).
Knight, W.; "Pocket-sized computer 'soul' developed"; New Scientist, Aug. 10, 2005 (2 pages).
Notice of Preliminary Rejection in Korean Patent Application No. KR 10-2019-7105081, with English translation, mailed May 23, 2022 (12 pages).

SYSTEM AND METHOD FOR DEVICE INTEROPERABILITY AND SYNCHRONIZATION

CROSS-REFERENCE TO RELATED APPLICATIONS

This application is a continuation of U.S. patent application Ser. No. 17/318,113, filed May 12, 2021, now allowed, which is a continuation of U.S. patent application Ser. No. 16/395,478, filed Apr. 26, 2019, now U.S. Pat. No. 11,048,520, which is a continuation-in-part of PCT Application No. PCT/IB2017/056516, filed on Oct. 19, 2017, which claims the benefit of and priority to U.S. Provisional Patent Application No. 62/413,169, filed on Oct. 26, 2016, all of which are incorporated herein by reference in their respective entireties.

FIELD OF THE INVENTION

The present disclosure relates to device interoperability for user devices.

BRIEF SUMMARY

A device interoperability system for one or more user devices associated with a user, wherein said one or more user devices comprises a first user device, said device interoperability system comprising a communications module, wherein a first connection is established between said first user device and said communications module; storage associated with said device interoperability system and coupled to said communications module, wherein said storage stores an operating system, one or more programs, and data associated with the user, further wherein said operating system is booted by said first user device via said first connection; and one or more processors to support said device interoperability system.

A method for device interoperability for one or more user devices associated with a user, said one or more user devices comprising a first user device; said method comprising providing a device interoperability system comprising a communications module, storage coupled to said communications module, enabling establishment of a first connection between said first user device and a said communications module; enabling said storage to store an operating system, one or more programs, and data associated with the user; and enabling booting of said operating system by said first user device via said first connection; enabling said operating system to run on said first user device, and use one or more processing capabilities of the first user device.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

Figure 1:
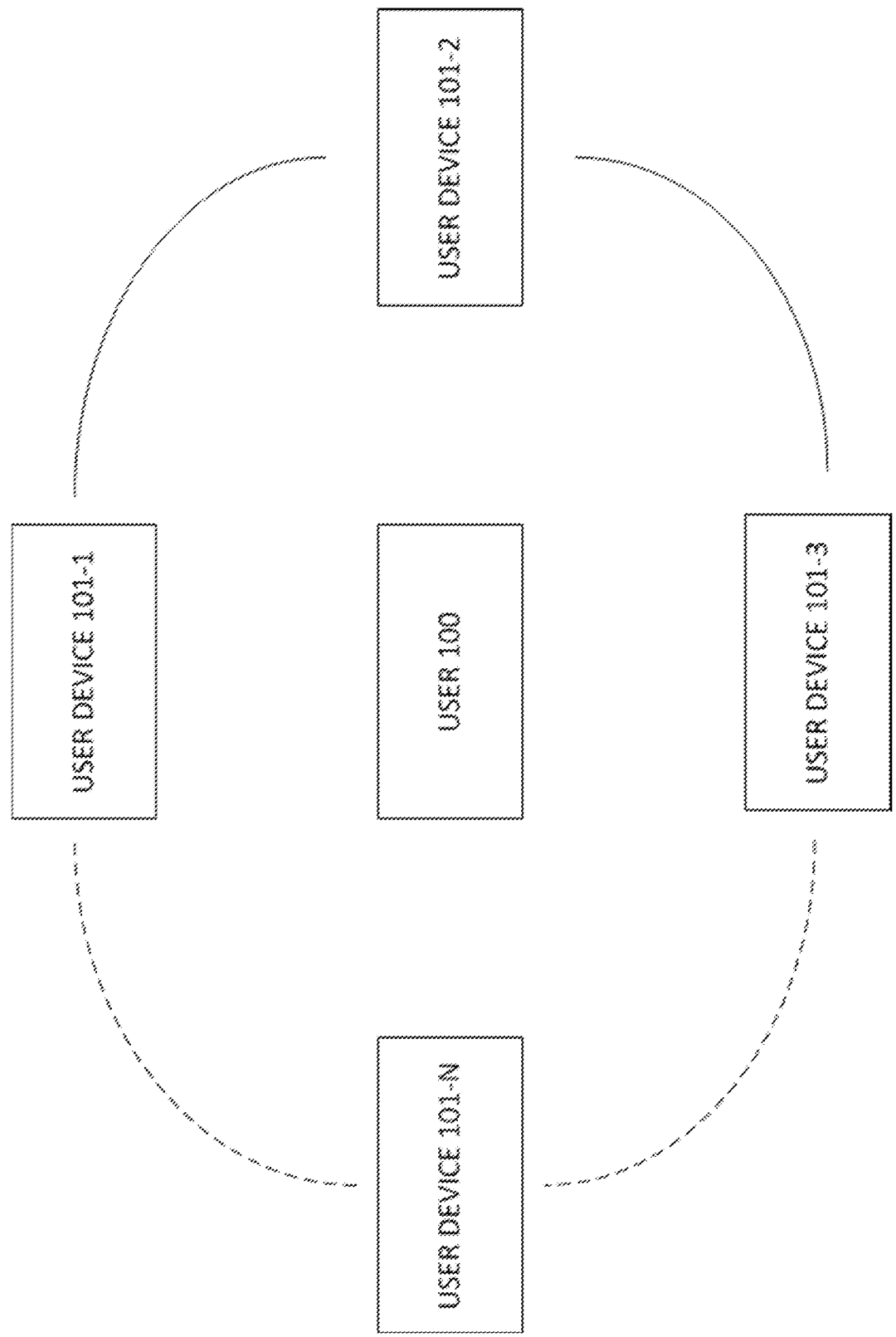
FIG. 1 illustrates a situation for a user with one or more user devices.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

The number of devices owned or operated by a person has grown tremendously. Typically, a person has a plurality of computing devices, such as:

Smartphones,
Tablets,
Desktops,
Laptops,

Game consoles,
Smart watches/bands, and
Smart glasses.

In addition, many other devices and items have become "smart", that is, their computing capabilities and processing power have increased, and they have been network enabled. These include, for example:
Vehicles such as cars and trucks,
Television (TV) sets,
Kitchen appliances such as refrigerators and microwave ovens,
Cameras,
Fitness devices such as FITBIT®,
Medical devices such as blood pressure monitors and heart rate monitors,
Air-conditioning systems, and
Smart home systems.

Furthermore the "Internet of Things" (IoT) has also grown tremendously. The IoT refers to networks of consumer and industrial devices interconnected with each other and with other computing devices.

All of this means that the number of devices which have computing and network capability, and are associated with a particular user, is growing rapidly.

FIG. 1 illustrates this situation. In FIG. 1, user devices 101-1 to 101-N comprise the devices associated with user 100. These include, for example, the electronic computing devices and the other devices and items mentioned above.

Given the situation shown in FIG. 1, users such as user 100 face many different challenges. Firstly, documents and data from different devices need to be synchronized with each other. Typically this is performed using, for example:
Portable data storage devices such as Universal Serial Bus (USB) flash drives, and removable hard drives, and
Network or "cloud"-based techniques.

These techniques of document and data synchronization have deficiencies. Cloud connectivity may not always be present. When it is, connectivity may be intermittent or slow. Privacy may also be an issue with cloud-based techniques.

Secondly, synchronization may be imperfect or incomplete due to each computing device and consumer item running different operating systems (OSes) and different platforms. Referring to FIG. 1, user device 101-1 to 101-N have their own processing and memory capabilities and may run different OSes, platforms and software. As a consequence the user is forced to get used to different environments on different devices and also to repeat the same tasks for several devices, for example, installing applications, customizing settings or performing service tasks like software updates or antivirus scanning. Compatibility may also be an issue. As an example, if user 100 edits a file first with user device 101-1 and then with user device 101-2, that file may end up being corrupted as a result due to the different versions of the editing software installed on user device 101-1 and 101-2.

It is therefore necessary to address these deficiencies in device synchronization in order to ensure continued growth and adoption of "smart" technology; and interoperability of these user devices.

Figure 2:
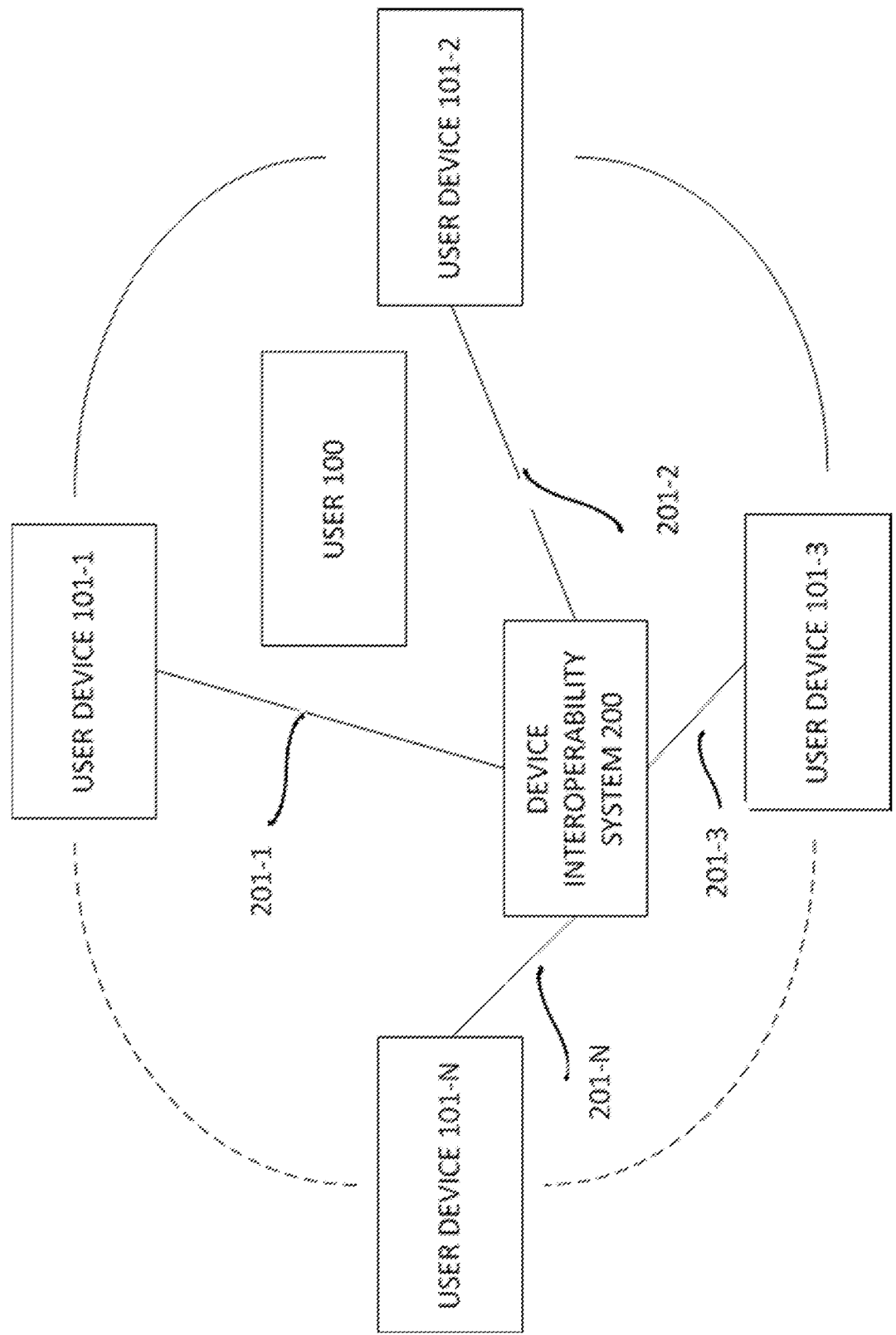
FIG. 2 illustrates an example of a device interoperability system working in conjunction with the user devices.
Figure 2B:
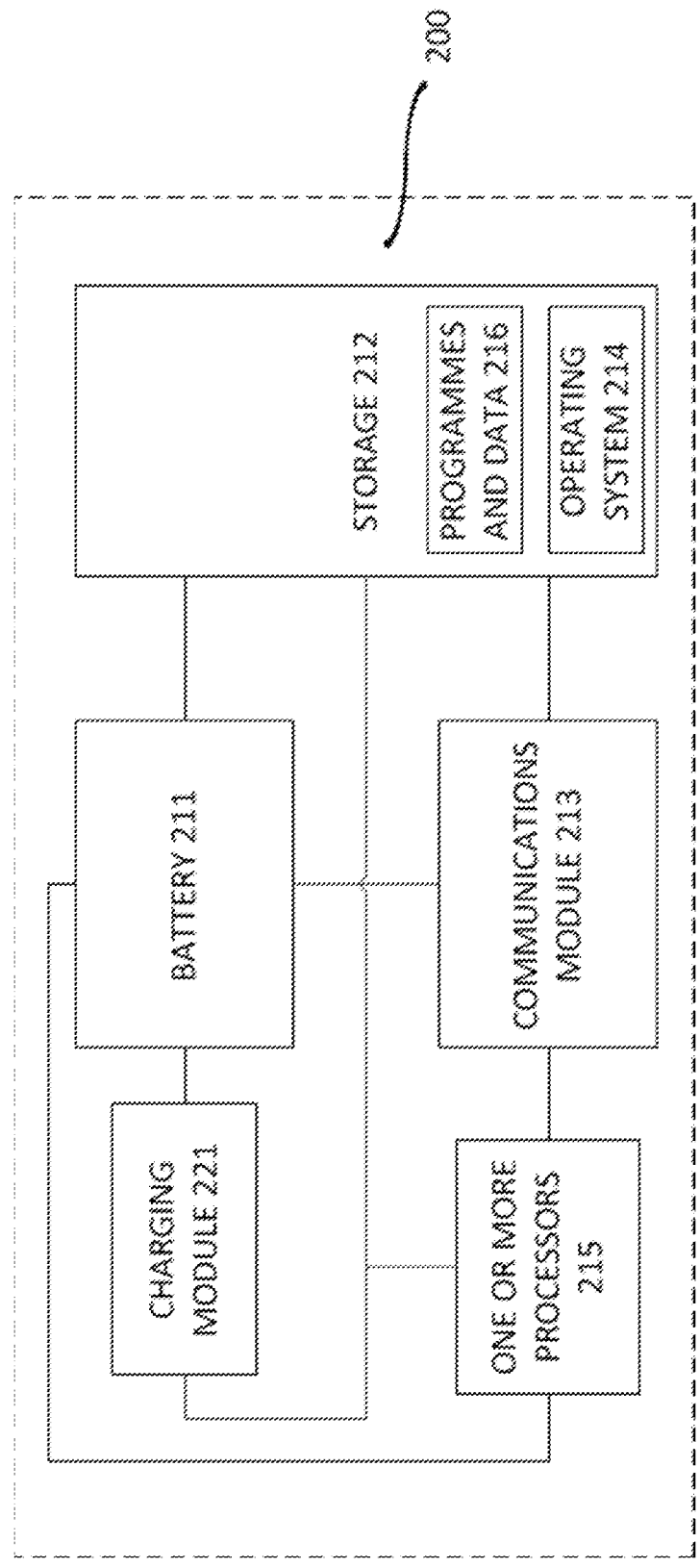
FIG. 2B illustrates an example architecture for the device interoperability system.

The remainder of this specification details a system and a method for device interoperability to address the above problems. An example architecture of such a device interoperability system 200 is shown in FIGS. 2 and 2B. In FIG. 2, one or more connections 201-1, 201-2, 201-3 to 201-N between device interoperability system 200 and one or more user devices 101-1, 101-2, 101-3 to 101-N are established as needed. In one embodiment, the one or more user devices 101-1, 101-2, 101-3 to 101-N initiate the establishment of the connection. In another embodiment, the device interoperability system 200 initiates the establishment of the connection.

Device interoperability system 200 comprises several components necessary for its functioning. An illustration of one embodiment of device interoperability system 200 is shown in FIG. 2B. As shown in FIG. 2B, device interoperability system 200 comprises battery 211, battery charging module 221, storage 212, one or more processors 215 and communications module 213.

The one or more processors 215 perform the functions of supporting the other elements of device interoperability system 200. This includes, for example:
maintaining interconnection between the elements of device interoperability system 200,
maintaining overall security of device interoperability system 200, and
service functions necessary for the operation of device interoperability system 200.

Communications module 213 participates in the establishment of the one or more connections 201-1 to 201-N. Communications module 213 also works to maintain the one or more connections 201-1 to 201-N to the one or more user devices 101-1 to 101-N. Communications module 213 also works to perform operations necessary to secure connections 201-1 to 201-N. These include, for example, encryption and access operations. In one embodiment, communications module 213 also manages and optimizes power consumption related to one or more connections 201-1 to 201-N. For example, communications module 213 adjusts the transmission powers used for the one or more connections 201-1 to 201-N based on distances from user devices such as user device 101-1.

Battery 211 supplies power for the operation of device interoperability system 200. Charging module 221 enables charging of battery 211 using an external power source. In one embodiment, charging module 221 enables wireless charging.

As shown in FIG. 2B, storage 212 is coupled to communications module 213 and is used to store OS 214, programmes and data 216 which are necessary for the functioning of device interoperability system 200. For example, user preferences, applications and user documents and data may also be stored on storage 212. The functioning of OS 214 will be discussed in detail below. In one embodiment, storage 212 is built using energy-efficient storage technology such as SSD (Solid State Drive) or embedded Multi-Media Controller (eMMC) flash memory technology. In one embodiment, the information stored in storage 212 is encrypted. This reduces the risk of a malicious party obtaining access to the stored information. In one embodiment, the Advanced Encryption Standard (AES) is used for encryption.

Referring to FIGS. 2 and 2B, connection 201-1 between device interoperability system 200 and user device 101-1 is established before the native user device 101-1 OS loads. Once connection 201-1 is established with user device 101-1, OS 214 boots and runs from storage 212 on user device 101-1. Then, user device 101-1 is able to access data and program code stored on storage 212 as required. The program code of OS 214 and installed applications is run on the user device which device interoperability system 200 is connected to, and uses the processing capabilities of this user device for its operation. For example, referring to FIG. 2, if device interoperability system 200 is connected to user device 101-1, then the program code is run on user device 101-1 using the processing power and memory of user device 101-1 as needed. The establishment of connection 201-1 and subsequent booting of OS 214 is performed in a variety of ways, as will be detailed below.

In one embodiment, at least one of the connections 201-1 to 201-N is a direct connection. This direct connection can be, for example, a direct wireless connection.

In some embodiments, user device 101-1 comprises firmware that provides the ability to support booting from device interoperability system 200 via a direct wireless connection. For example, in one embodiment, user device 101-1 comprises a Basic Input Output System (BIOS) or Unified Extensible Firmware Interface (UEFI) which supports the Media Agnostic USB specification. This allows the user device 101-1 to use the USB protocol over the direct wireless connection to facilitate the booting of OS 214 on the user device 101-1 and data transfer between device interoperability system 200 and user device 101-1.

In some embodiments, user device 101-1 does not comprise firmware that provides the ability to support booting from device interoperability system 200 via a direct wireless connection. Then it is necessary to use an intermediary. For example, in one embodiment, the device interoperability system 200 is coupled wirelessly to a miniature USB dongle plugged into a USB port on user device 101-1. Then the miniature USB dongle will simulate a USB flash drive connected to user device 101-1. Then when user device 101-1 is switched on, the direct wireless connection is established between the miniature USB dongle and device interoperability system 200. Then OS 214 is booted on the user device 101-1 from the storage 212 as though it is an ordinary USB flash drive connected to the USB port. In one embodiment, the user must change the BIOS or UEFI settings for user device 101-1 so that user device 101-1 will boot from the device interoperability system 200.

In another embodiment, the direct connection is a direct wired connection. In a further embodiment, the at least one direct wired connection includes, for example, a USB connection. In further embodiments, the direct wired connection is a connection facilitated via docking. In yet another embodiment, at least one of the connections 201-1 to 201-N are direct wireless and at least one of the connections 201-1 to 201-N are direct wired.

When connection 201-1 between user device 101-1 and device interoperability system 200 is facilitated via docking, further embodiments are also possible. In one embodiment, both the device where device interoperability system 200 is installed, and user device 101-1 have direct docking capabilities including, for example, docking ports. Then, device interoperability system 200 interacts with the user device 101-1 via these direct docking capabilities. In yet another embodiment, the device where device interoperability system 200 is installed is coupled to a docking station which is connected to user device 101-1. In a further embodiment, when the docking station is connected to user device 101-1 by, for example, USB cable, the user device 101-1 will recognize the docking station with the device where device interoperability system 200 is installed as a connected external USB drive. In one embodiment, the user must change the BIOS or UEFI settings for user device 101-1 so that user device 101-1 will boot from the USB connected device. In a further embodiment, the docking station provides charging for the device where device interoperability system 200 is installed.

While the above describes situations where connections 201-1 to 201-N are direct connections between two devices, one of skill in the art would know that it is possible to use indirect connections as well. In another embodiment, at least one of the connections 201-1 to 201-N are indirect connections. These indirect connections include, for example, one or more of:

connections facilitated via a Local Area Network (LAN), or connections facilitated via a cloud-based service.

In a further embodiment, when at least two of the described above types of connection are available, the choice between connection types is performed automatically for at least one of the connections 201-1 to 201-N. In one embodiment, the choice is based on the following factors:

connection speed,
connection latency,
data transmission costs,
user preferences.

In a further embodiment, when the connectivity is lost, either a different type of direct or indirect connection is automatically selected.

In a further embodiment, the at least one connection is secured. The securing is performed by, for example:

Encryption using techniques such as Wi-Fi Protected Access (WPA2), and

Requiring access authentication on both endpoints of a connection when the connection is first established. This is performed using, for example passwords and techniques such as near field communication (NFC) or Wi-Fi Protected Setup (WPS)-like algorithms.

In embodiments where the at least one connection is secured, before establishing the connection authentication is performed at the end points, that is, between device interoperability system 200 and user device 101-1.

Figure 2C:
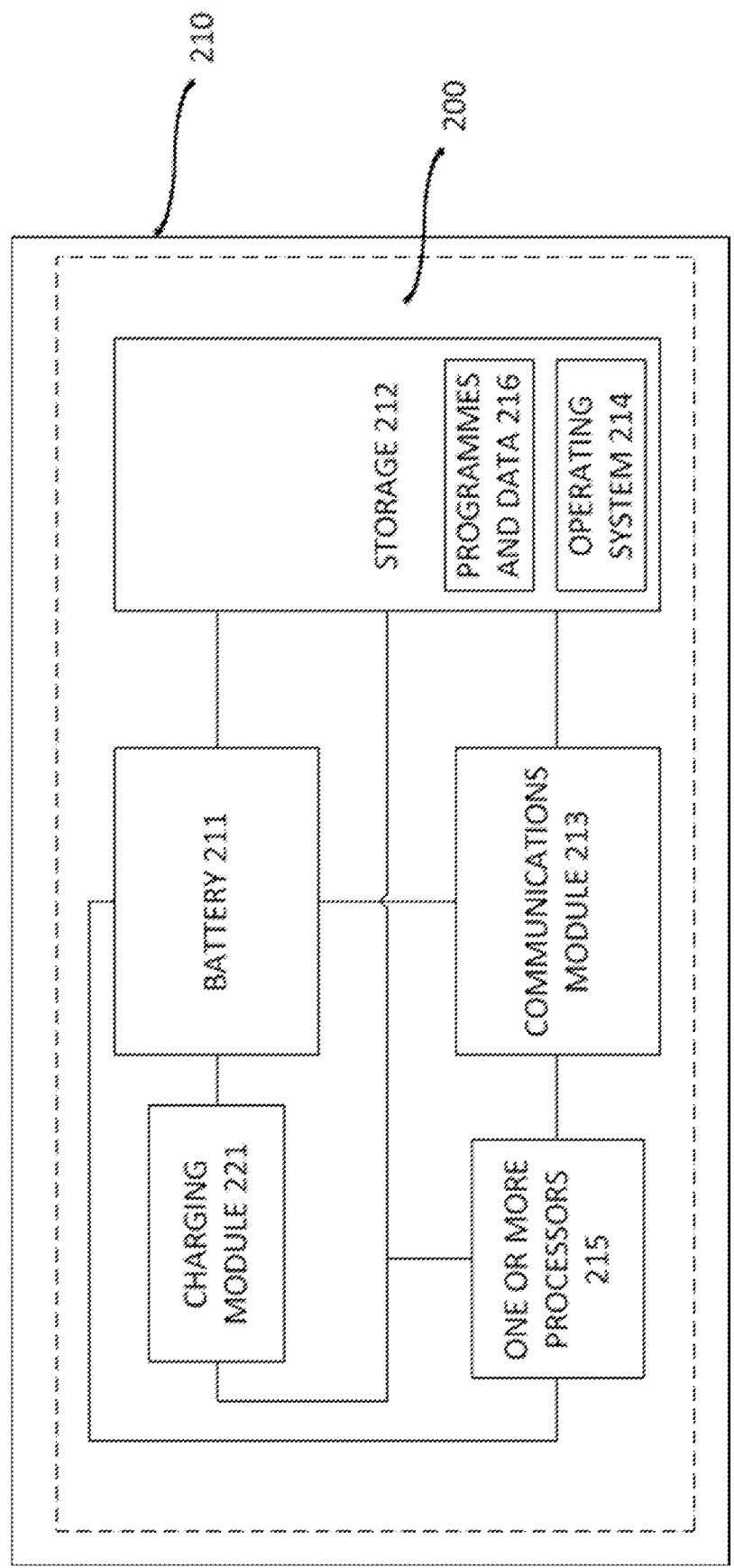
FIG. 2C illustrates an example of a gadget to run the device interoperability system.

Device interoperability system 200 can be implemented in a variety of ways. In one embodiment, device interoperability system 200 is implemented using a separate gadget, such as gadget 210 as shown in FIG. 2C. Then, the one or more connections 201-1 to 201-N are established with gadget 210.

Figure 2D:
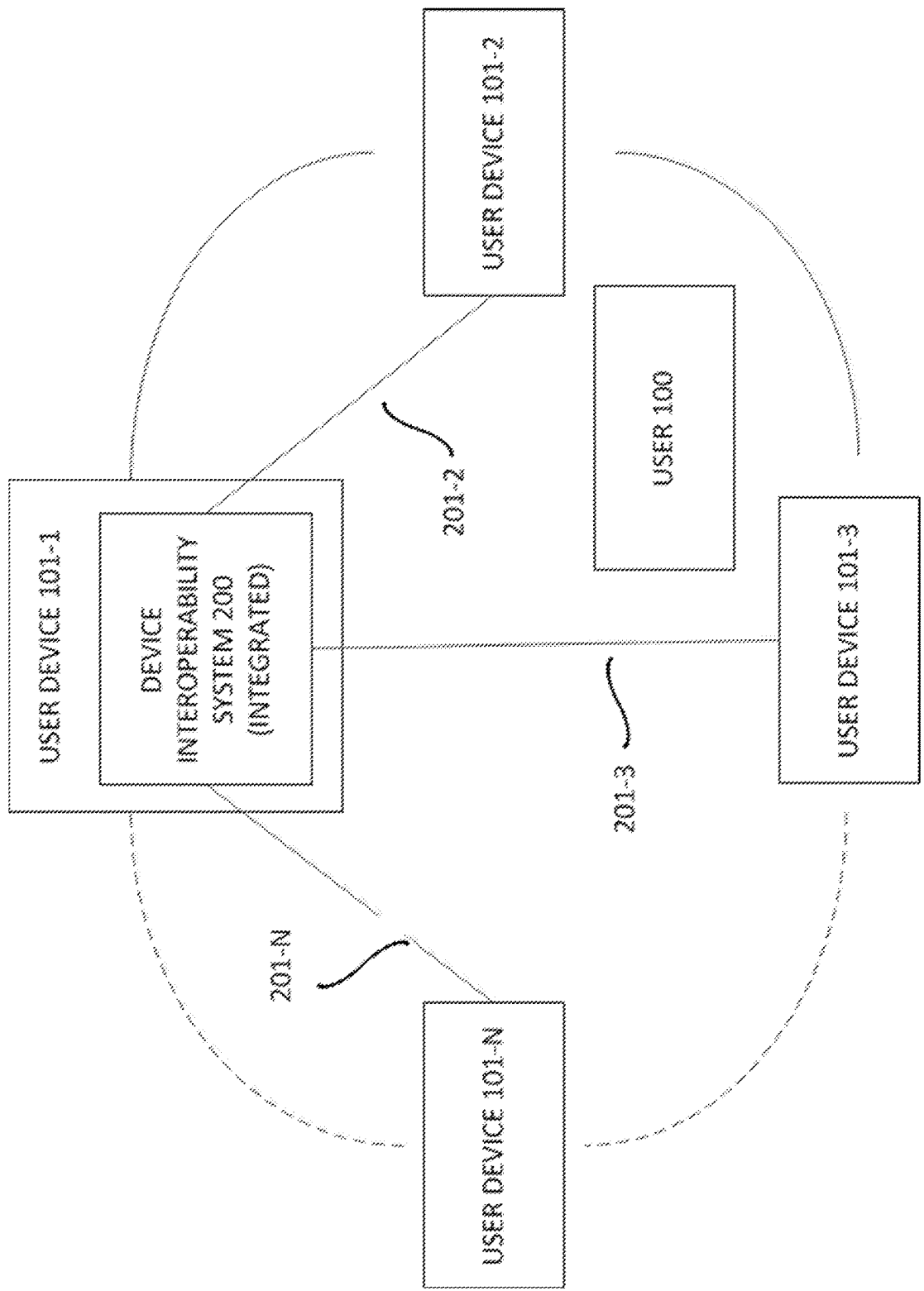
FIG. 2D shows an example where the device interoperability system is integrated into a user device.

In another embodiment, device interoperability system 200 is installed via integration into one of user devices 101-1 to 101-N. For example, as shown in FIG. 2D, device interoperability system 200 is integrated into user device 101-1. This is achieved by, for example, implementing device interoperability system 200 as a firmware module of user device 101-1. Then, device interoperability system 200 uses one or more of the battery, storage, communications module, processors and other capabilities of user device 101-1 in a similar fashion to the above-described use of battery 211, storage 212, one or more processors 215 and communications module 213 for its operation. OS 214 is stored within the storage of user device 101-1. Then the user device 101-1 runs OS 214 instead of its native OS. When, as shown in FIG. 2D, at least one of connections 201-2 to 201-N are established between user device 101-1 and at least one of the other devices 101-2 to 101-N, device interoperability system 200 enables the connected user device to:

boot OS 214 which is stored in the storage of user device 101-1, and use programmes and data 216 which are stored in the storage of user device 101-1.

In a further embodiment, some hardware components of the user device 101-1 with integrated device interoperability system 200 are recognised and used by the OS 214 as connected external devices, when OS 214 runs on a different device which is connected to user device 101-1. For example, in the case where user device 101-1 is a smartphone: When OS 214 runs on user device 101-2 which is connected to user device 101-1, the hardware components of user device 101-1 such as the microphone, sensors, mobile telecommunications module and display are used by OS 214 as external devices.

Figure 2E:
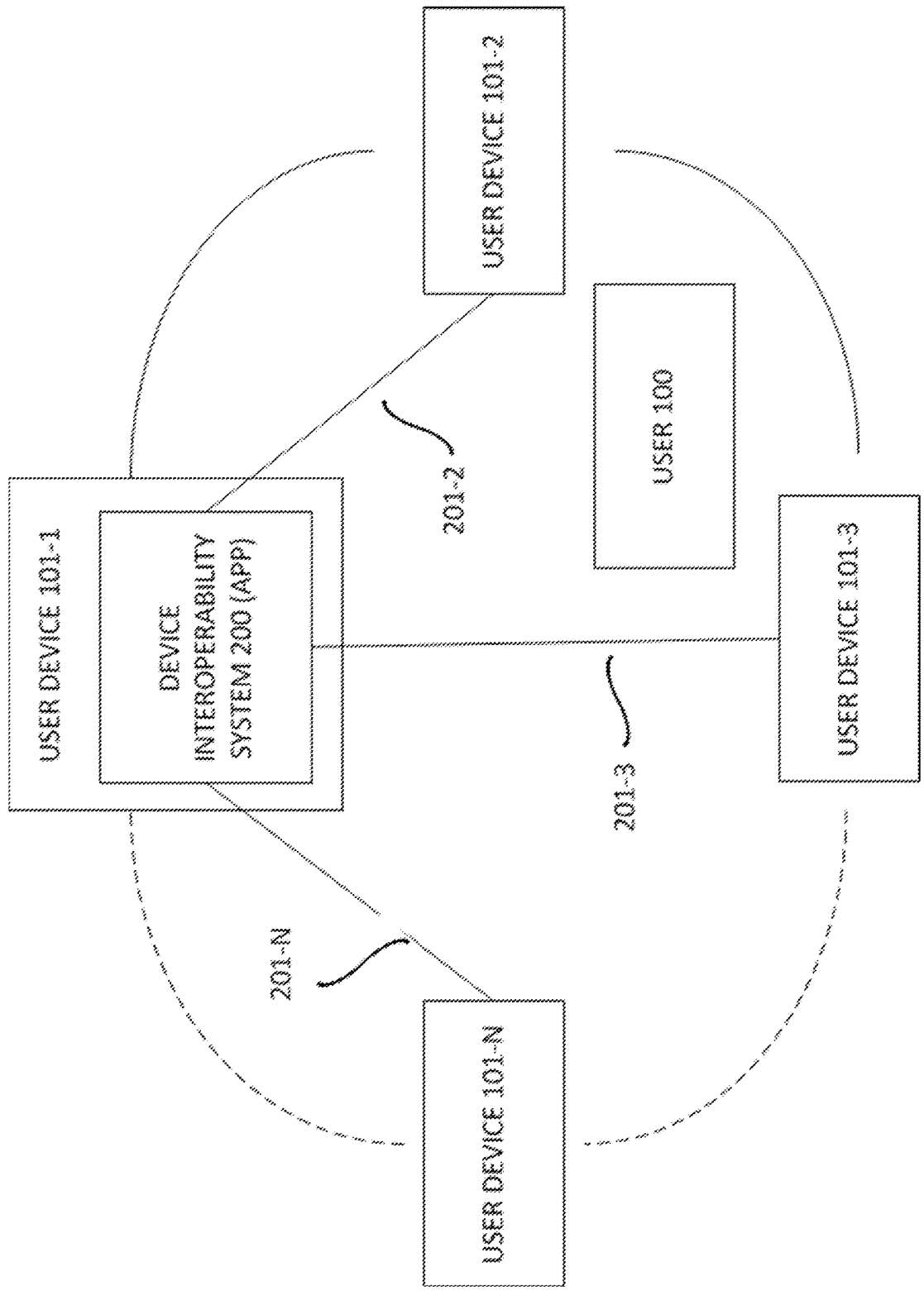
FIG. 2E shows an example where the device interoperability system runs as an application on a user device.

In yet another embodiment, device interoperability system 200 is implemented as an installed application or an "app" which runs on one of user devices 101-1 to 101-N, for example user device 101-1. For example, as shown in FIG. 2E, device interoperability system 200 runs as an app on user device 101-1. Then device interoperability system 200 uses one or more of the battery, storage, communications module, processors and other capabilities of user device 101-1 for its operation, similar to the integrated case described above and in FIG. 2D. Similar to as described above, when a connection is established with a user device, device interoperability system 200 gives the connected user device the ability to boot OS 214 which is stored in the storage of user device 101-1. In another embodiment, in case the app is not able to provide the required level of access to data stored on storage 212 of user device 101-1 which is used to boot OS 214 on user device 101-2, the interoperability system 200 also includes a separate image of
either a copy of the OS 214, or
some of its components.
This image is used on its own or in conjunction with user device 101-1 OS's components stored on storage of user device 101-1 to boot the OS on user device 101-2. Similar to the cases described above, in a further embodiment, some hardware components of the user device 101-1 are recognised and used by the OS 214 as connected external devices, when OS 214 runs on a different device which is connected to user device 101-1.

In some of the embodiments where device interoperability system 200 is installed via integration into user device 101-1 or as an app on user device 101-1, as part of communications module 213, an external wireless adapter is added to user device 101-1 to provide additional communications capabilities not available on user device 101-1, so as to improve performance and/or energy efficiency. This external wireless adapter works with, for example, an integrated controller which is already present on user device 101-1. Then, the communications module 213 comprises the integrated controller and the external wireless adapter of user device 101-1. For example, a USB wireless adapter based on WiGig or Li-Fi communication technology is plugged into a USB port of user device 101-1. This plugged in wireless adapter will interact with an integrated USB controller already present on user device 101-1. Then, the communications module 213 comprises this integrated USB controller and plugged in USB wireless adapter. These added components provide additional communication technology which is not initially available on user device 101-1 to improve performance and/or energy efficiency.

An example of the operation of device interoperability system 200 will be detailed below with reference to a user device, specifically user device 101-1. The descriptions below are applicable to a variety of situations including, for example:
device interoperability system 200 installed on a gadget such as gadget 210;
device interoperability system 200 is installed via integration into one of user devices different from user device 101-1, for example user devices 101-2 to 101-N; and
device interoperability system 200 is installed as an app on one of user devices different from user device 101-1, for example user devices 101-2 to 101-N.

Additionally, there is a need to determine if user device 101-1 will operate in either "stand-alone" or "device interoperability system" mode. In stand-alone mode, the user device 101-1 runs its native OS. In interoperability system mode, the user device 101-1 is connected to device interoperability system 200 and runs OS 214. In a further embodiment, the user device 101-1 is switchable between stand-alone and interoperability system modes.

Figure 3:
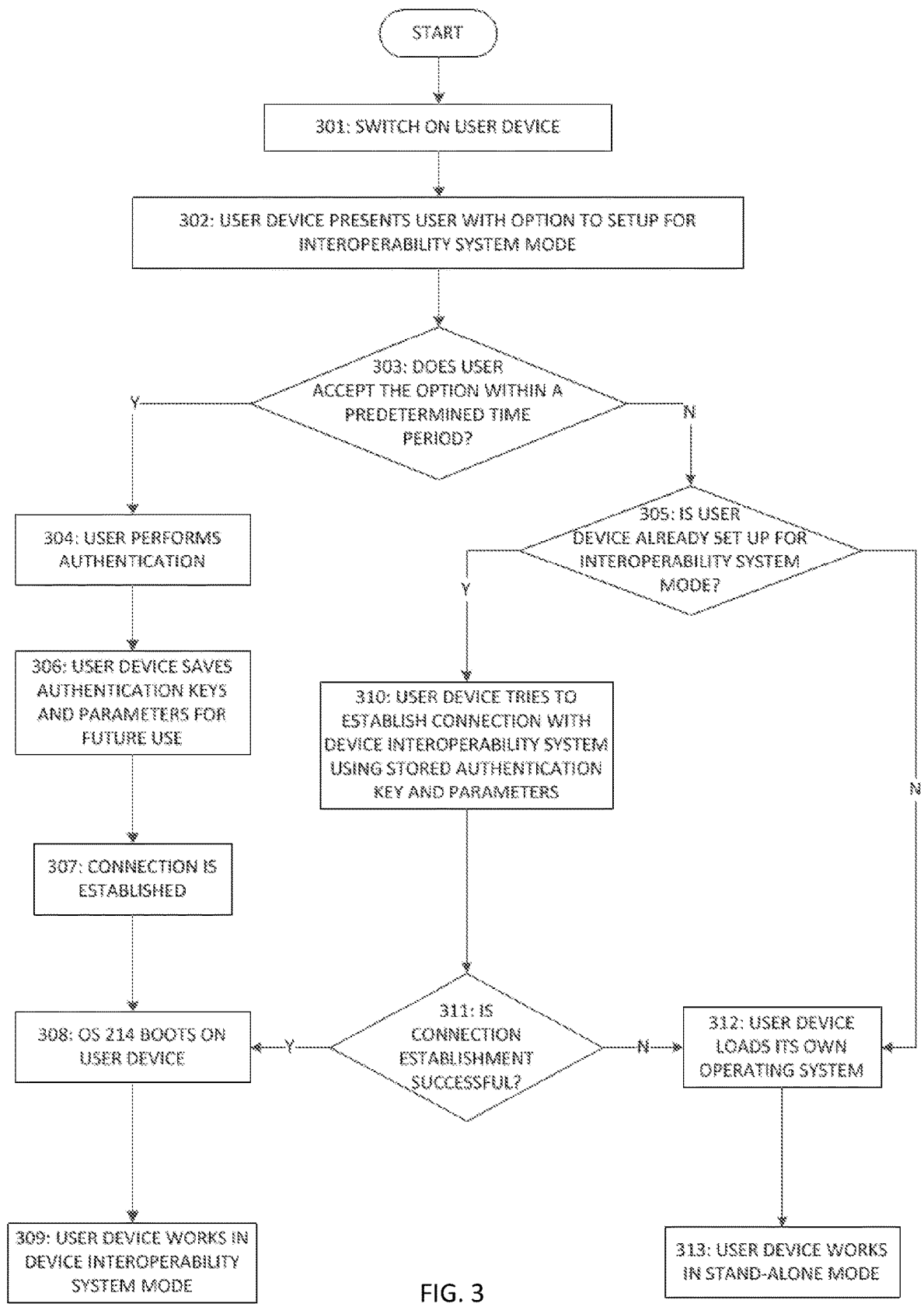
FIG. 3 shows an example algorithm for user device switchability between "stand-alone" and "interoperability system" modes.

An example algorithm for switching between stand-alone and interoperability system modes comprising:
establishment of connection 201-1 in the embodiments where connection 201-1 is a secured connection,
subsequent booting of the appropriate OS depending on whether stand-alone or interoperability modes is used,
is provided in FIG. 3.

In FIG. 3, in step 301, user device 101-1 is switched on. In step 302, prior to establishing connection 201-1, user device 101-1 presents the user with the option of setting up for interoperability system mode.

If the user accepts the option of setting up for interoperability system mode within a predetermined period in step 303, then in step 304 the user performs authentication. In one embodiment, in step 304 the user enters a unique string, password or passphrase specific to the device interoperability system 200. In another embodiment, in step 304 the user enters a login name and a password specific to the OS 214. In yet another embodiment, the user uses login details from another social media site, or web mail site, for example, Facebook®, LinkedIn®, Twitter®, Google®, Gmail®, or others. Additional steps are also possible for authentication. In another embodiment, the user is additionally asked to recognise a combination of letters, numbers and symbols in an image and enter the combination into a box. An example of such a test is the Completely Automated Public Turing test to tell Computers and Humans Apart (CAPTCHA) test. In another embodiment, the user is asked a security question, to which the user only knows the answer. In yet another embodiment, the user may be asked additional personal information, such as date of birth and home address. In another embodiment, the user is asked to take a picture of himself or herself and the device interoperability system 200 will match the image to a pre-stored image. In yet another embodiment other biometric measures such as fingerprints scanning are used. The authentication data is used as a pre-shared key and authentication/encryption keys for encrypted connection are built.

In step 306, the user device saves the authentication/encryption keys and connection parameters for future use.

In step 307, connection 201-1 is established.

In step 308, OS 214 boots on user device 101-1.

In step 309, the user device 101-1 works in device interoperability system mode.

If the user does not accept the option of setting up for interoperability system mode in step 303, then in step 305, user device 101-1 determines if it is already set up for interoperability system mode. If in step 305 the user device 101-1 is already set up, then in step 310 the user device tries to establish a connection with device interoperability system 200 using the stored authentication keys and parameters.

Following on from step 310, if the connection establishment is successful in step 311 then the OS 214 boots on user device 101-1 (step 308), and the user device 101-1 works in device interoperability system mode (step 309).

If the connection is unsuccessful in step 311, then user device 101-1 loads its own OS in step 312. In step 313, the user device 101-1 works in stand-alone mode.

If in step 305 the user device is not already set up, then the user device 101-1 loads its own OS (step 312) and works in stand-alone mode (step 313).

In one embodiment, in order to improve speed of operation and to reduce the amount of data transmitted through a connection such as connection 201-1, the swap file or swap partition of OS 214 is placed on the storage of the user device 101-1.

In one embodiment, in order to improve speed of operation, caching is performed by, for example, setting aside a portion of the storage of the connected user device for a cache. In one embodiment, when OS 214 is booted, it will determine if there is a cache on the connected user device. Caching operations will be discussed in detail further below.

In one embodiment, at least some portion of the local storage of a user device connected to device interoperability system 200 is used by OS 214 to store data intended for use only on this particular device. An example is where user device 101-1 is a desktop used by user 100 specifically for running high resource demand applications such as video games. Then, some of the data necessary for running the high resource demand application is stored on the local storage of user device 101-1 instead of storage 212. In a further embodiment, the portion of the user device 101-1 storage which is to be used is recognized by OS 214 as a connected additional drive and presented accordingly.

In one embodiment, a portion of the local storage space of a user device connected to device interoperability system 200 is used by OS 214 to perform a backup of at least some of the data stored in storage 212. The amount of data which is backed up depends on the available capacity of the local storage of the user device. In a further embodiment, the backup is performed using a plurality of user devices. That is, data is backed up from storage 212 to a portion of each local storage space corresponding to each of the plurality of user devices.

In yet another embodiment, a backup status is associated with each portion of data stored in storage 212. Then when a backup operation is performed on that particular portion of data, the backup status is updated.

In a further embodiment, at least some of the data which is stored on the storage of user device 101-1 for either caching, swapping, expanding storage, backups or any combination of these purposes is placed in one or more partitions set up on the storage of user device 101-1. In another embodiment, the data which is stored on the storage of user device 101-1 for either caching, expanding storage, backups or any combination of these purposes is placed in one or more file-containers created in an existing partition of user device 101-1. This eliminates the need for repartitioning or erasing any data from the storage of user device 101-1.

In a further embodiment, the data which is stored on the storage of user device 101-1 for either caching, swapping, expanding storage, backups or any combination of these purposes is encrypted. The decryption keys are stored and managed by OS 214 thus preventing unauthorized access to the data.

Figure 3B:
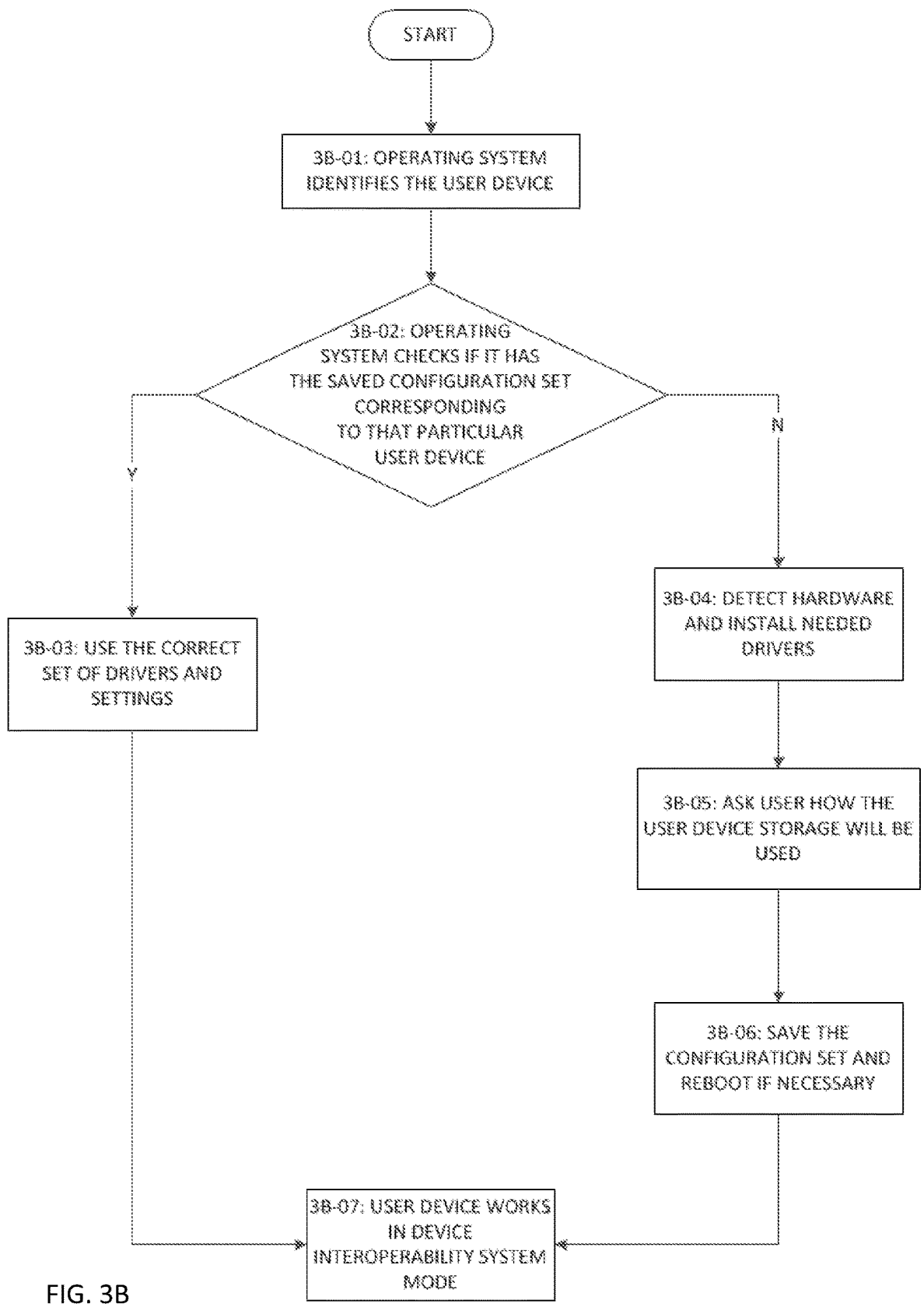
FIG. 3B shows an example algorithm for switching the operating system between different hardware configurations on booting.

In one embodiment, the OS 214 is able to switch between different hardware configurations during booting, such as in step 308 of FIG. 3. An example algorithm for switching between different hardware configurations is provided in FIG. 3B.

When the OS 214 is booted on a user device such as user device 101-1, then in step 3B-01 OS 214 identifies the user device. In step 3B-02, OS 214 determines whether it has stored the configuration set corresponding to the identified user device in storage 212. If yes, then in step 3B-03 OS 214 uses the correct set of drivers and setting for the identified user device. The user device then works in device interoperability system mode in step 3B-07.

If in step 3B-02 OS 214 is unable to find the configuration set corresponding to the identified user device in storage 212, then in step 3B-04 OS 214 will detect all hardware on this user device and install needed drivers automatically.

In step 3B-05, OS 214 prompts the user to enter one or more answers to one or more questions to determine how the user device storage will be used for the functioning of OS 214. Example questions include:
will the user device storage be used for caching?
will the user device storage be used for backups?
will the user device storage be used to provide additional storage space for OS 214 for its use?
how much space will be reserved for specified above purposes?

In step 3B-06, OS 214 will save the configuration set and reboot if necessary, before proceeding to work in device interoperability system mode in step 3B-07.

As mentioned previously, example embodiments of caching operations are discussed in detail below with reference to FIGS. 4, 4B and 4C.

Figure 4:
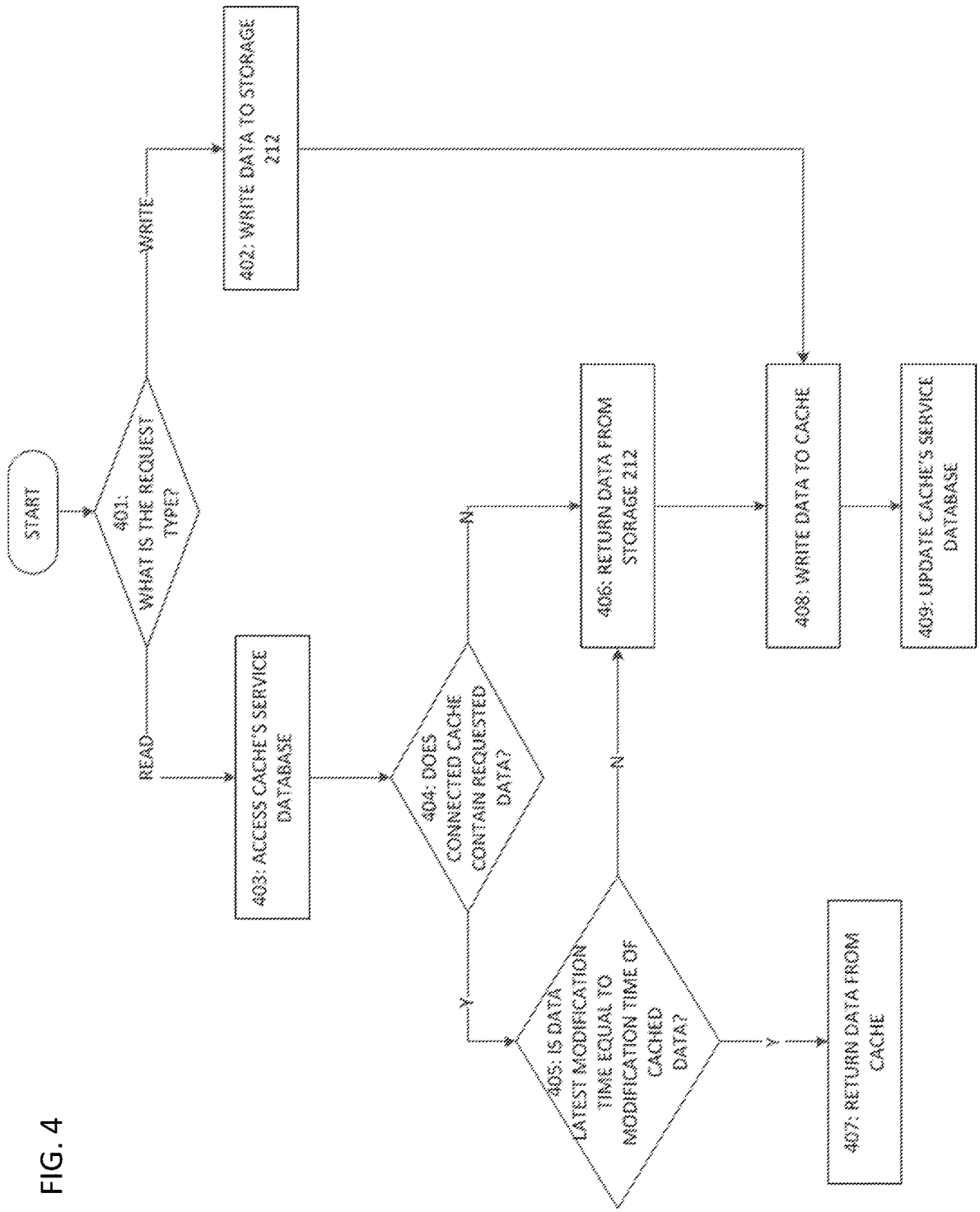
FIG. 4 shows an example embodiment of a caching operation.
Figure 4B:
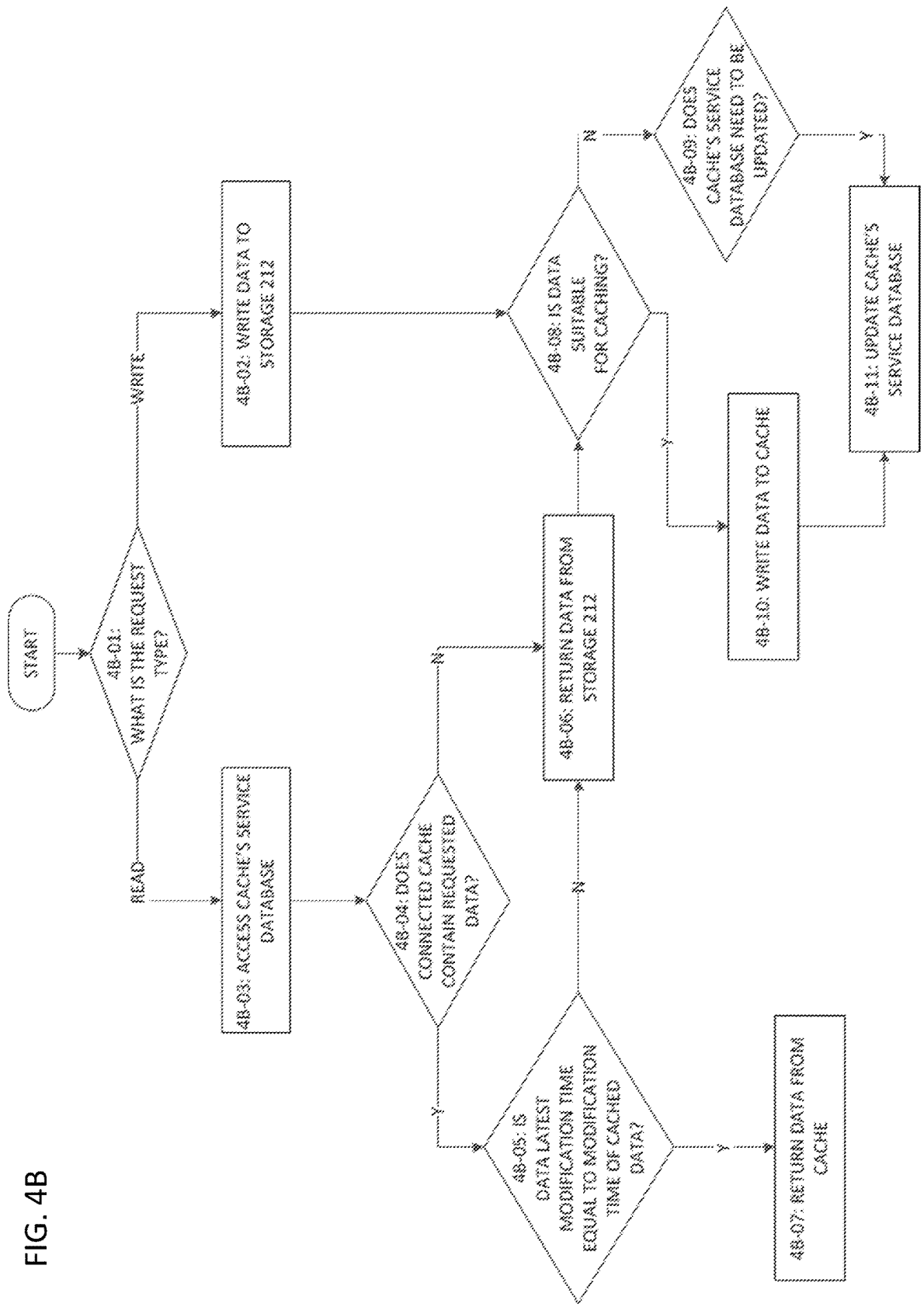
FIG. 4B illustrates an example embodiment of caching where additional checks are performed before writing data to the cache.

FIG. 4 shows an example flow when a received read or write operation request is processed by OS 214. In this example OS 214 is stored on the device where device interoperability system 200 is installed. This device is connected to user device 101-1. Also, a cache has been set up on user device 101-1.

In step 401, the request type is determined by OS 214.

If the request is determined to be for a read operation, then in step 403 the OS 214 determines if the cache contains the requested data. In one embodiment, OS 214 accesses the cache service database to determine if the cache set up on user device 101-1 contains the requested data. The cache service database describes modification times of the versions of the files stored in at least one of the caches of the user devices 101-1 to 101-N, and modification times of the original versions of those files stored in the storage 212. Determination if the cache contains the requested data is performed by comparison of those modification times. The cache service database is stored in storage 212.

Table 1 shows an example of a cache service database:

TABLE 1

Example of Cache Service Database

| File [1C-01] | Storage 212 [1C-02] | Cache #1 [1C-03] | Cache #2 [1C-04] | ... |
|---|---|---|---|---|
| C:\path1\file1 [1R-01] | dd/mm/yy HH:MM:SS [1R-01, 1C-02] | dd/mm/yy HH:MM:SS [1R-01, 1C-03] | dd/mm/yy HH:MM:SS [1R-01, 1C-04] | |
| C:\path2\file2 [1R-02] | dd/mm/yy HH:MM:SS [1R-02, 1C-02] | n/a [1R-02, 1C-03] | dd/mm/yy HH:MM:SS [1R-02, 1C-04] | |
| ... | | | | |

In Table 1, column 1C-01 represents the files. Each file corresponds to a separate row of Table 1. With reference to Table 1, file 1 is assigned to row 1R-01, file 2 is assigned to row 1R-02 and so on.

Column 1C-02 of Table 1 represents the modification times of the original versions of those files stored in the storage 212 and in at least one of the caches on the user devices 101-1 to 101-N. Then, referring to Table 1:
Cell [1R-01, 1C-02] represents the modification time of the original version of file 1 in storage 212, Cell [1R-02, 1C-02] represents the modification time of the original version of file 2 in storage 212, Columns 1C-03 and 1C-04 represent the modification times of the versions of the file in the respective caches. For example, column 1C-03 corresponds to the cache 1 stored on user device 101-1, 1C-04 corresponds to cache 2 stored on user device 101-2, and so on. Then:

Cell [1R-01, 1C-03] represents the modification time of the version of file 1 in cache 1, Cell [1R-01, 1C-04] represents the modification time of the version of file 1 in cache 2, Cell [1R-02, 1C-03] represents the modification time of the version of file 2 in cache 1, and Cell [1R-02, 1C-04] represents the modification time of the version of file 2 in cache 2.

There are a variety of formats which can be used to represent the times in the cache service database. One example format is a two-digit representation of day/month/year followed by hour:minute:second or "dd/mm/yy HH:M-NI:SS".

There is a variety of other information which can be also included in the cache service database. For example, the cache service database can also include file sizes and checksums for data integrity checks.

In another embodiment the cache service database is based on file checksums instead of file modification times. Then, the cache service database describes checksums of the versions of the files stored in at least one of the caches of the user devices 101-1 to 101-N, and checksums of the original versions of those files stored in the storage 212. Determination if the cache contains the requested data is performed by comparison of those checksums.

If the data cannot be found on the cache in step 404, or the data on the cache has a modification time which is different from the modification time of the corresponding data on storage 212 (step 405), or the checksums are different; then OS 214 retrieves the data from storage 212 (step 406). In step 408, the retrieved data is then written into the cache, so that subsequent data read operations are performed using the cache. This also has the advantage of reducing the power consumption of the device where device interoperability system 200 is installed, as data does not have to be transmitted from this device to user device 101-1 via connection 201-1. In step 409, the cache service database is also updated.

If, in step 404 the data is found on the cache, and the data on the cache matches the corresponding data on storage 212 (step 405); then in step 407 the data is read from the cache.

In a further embodiment, if the request type is determined to be a write operation in step 401, then in step 402 OS 214 performs a data write operation. In one embodiment, this data write operation is performed in write-through mode. Then, following from the OS 214 writing the data to storage 212 via connection 201-1 in step 402, OS 214 also writes data to the user device 101-1 cache in step 408. In step 409, the cache service database is also updated.

In another embodiment, one or more additional checks are performed to determine whether the data should be written to the cache. FIG. 4B illustrates an example of an embodiment. Steps 4B-01 to 4B-07 are similar to steps 401-407 in FIG. 4. In step 4B-08, additional checks are used to determine if the data is suitable for caching. Examples of the factors which are examined to determine if the data is suitable for caching include:

Maximum capacity of the cache,
Utilization of the cache capacity,
Size of data item,
Usage frequency of data item,
Time expiration of data item,
Currently running applications,
Previously collected data usage patterns, and
Device type of user device 101-1.

If the data is determined to be suitable for caching in step 4B-08, then in step 4B-10 the data is written to the cache and in step 4B-11 the cache service database is updated.

In one embodiment, the OS 214 performs additional cache servicing functions, for example:

cache defragmentation, or
deletion of less cache-suitable data to free up space.

Then, the above described factors used in step 4B-08 are used to optimize the performance of these additional cache servicing functions as well.

In a further embodiment, if the data is determined to not be suitable for caching in step 4B-08, then in step 4B-09 an additional check to determine the necessity of updating of the cache service database is performed. For example, if the data is determined not to reside in any cache of any user device, then it is unnecessary to update the cache service database.

In one embodiment, when user device 101-1 runs OS 214, data is prefetched from storage 212 and used to update the user device 101-1 cache. That is, data is fetched from storage 212 and transmitted to the user device 101-1 cache in readiness for future use.

Figure 4C:
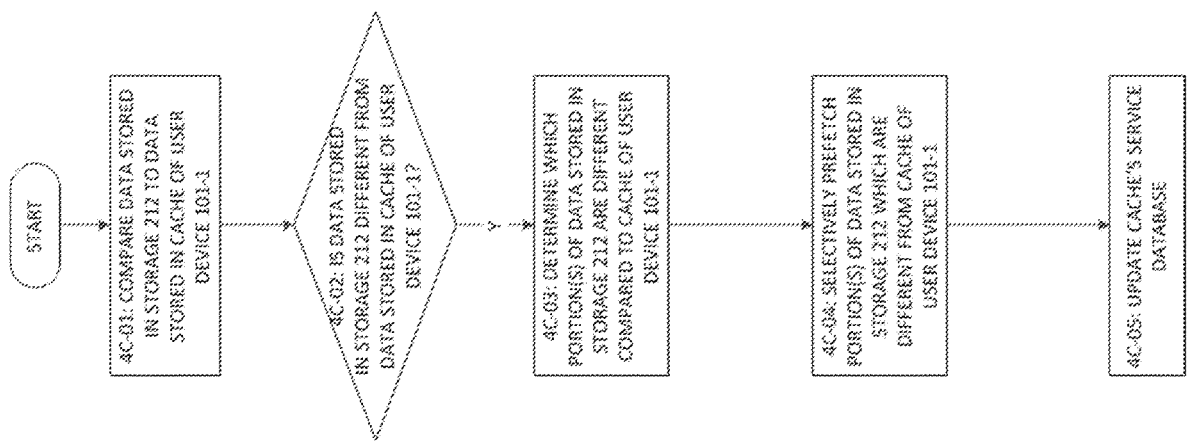
FIG. 4C shows an example embodiment of prefetching to a cache.

FIG. 4C shows an example embodiment of prefetching. In step 4C-01, data stored in storage 212 is compared by the OS 214 to the data stored in the user device 101-1 cache. The OS 214 performs the data comparison by comparing the information from the cache service database corresponding to user device 101-1, to the information stored in file system of the storage 212.

If the data stored in the connected cache is determined not to match the data stored in storage 212 in step 4C-02, then in step 4C-03 the OS 214 determines which of the one or more portions of data stored in storage 212 are different compared to the data on the user device 101-1 cache.

In a further embodiment, in step 4C-04, OS 214 selectively prefetches one or more portions of data stored in storage 212 which are different from the data stored in the cache of user device 101-1.

The selection and prioritization of data depends on several factors:

Connection of the device where device interoperability system 200 is installed to a power source,
Charge level of battery 211,
Total capacity of battery 211,
Current utilization of connection 201-1,
Current user activity,
Current hardware utilization of user device 101-1
Maximum capacity of the connected cache,
Utilization of the cache capacity,
Size of data portion,
Usage frequency of data item,
Time expiration of data item,
Currently running applications,
Previously collected data usage patterns, and
Device type of user device 101-1.

Then in step 4C-05, the cache service database is updated accordingly based on the data stored in the user device 101-1 cache.

In one embodiment, security measures are used so as to reduce the risk of a malicious party gaining access to device interoperability system 200. For example, in one embodiment access to device interoperability system 200 is secured using biometric measures such as fingerprints scanning or facial recognition.

In other embodiments, multi-factor authentication is used to secure device interoperability system 200. In some embodiments, a multi-factor authentication process is based on the following factors, or answering the following questions:

The knowledge factor, or what I know;
The possession factor, or what I have; and
The inherence factor, or what I am.

In one embodiment, the OS 214 is able to pause its operation if the connection 201-1 is lost, and resume operation immediately when the connection is reestablished.

In one embodiment, OS 214 includes one or more kernels corresponding to one or more architectures. For example, OS 214 includes kernels for the x86 and ARM architectures. Then depending on the architecture of the connected user device, the appropriate kernel is used automatically. This behavior is completely transparent for the user.

In one embodiment, a graphical user interface (GUI) is generated on user device 101-1 to enable the user to interact and interface with user device 101-1 including OS 214. In one embodiment, the OS 214 automatically optimizes and adapts the GUI according to the following factors:

physical form-factor of the user device 101-1. For example, what type of device is user device 101-1? Is it a laptop, tablet, TV set, game console or integrated in-car system?
number and size of screens associated with the user device 101-1;
screen resolution; and
input methods. For example, is the input device a keyboard and mouse, touchscreen, infrared remote control or gamepad?

Examples of GUI optimizations and adaptations include:
adjusting the size and placement of GUI control elements such as buttons and checkboxes;
adjusting the size and placement of windows;
enabling or disabling specific text input methods such as on-screen keyboard or voice text input;
enabling or disabling GUI parts for device-specific features such as controls for in-car air conditioning system.

In one embodiment, OS 214 is only able to work on one connected user device at a time. An example is when OS 214 is running on user device 101-1. Then, to work on a different user device such as user device 101-2 after establishing connection 201-2, in one embodiment OS 214 must be shut down on user device 101-1, then booted on user device 101-2. In another embodiment, OS 214 operation on user device 101-1 is first paused. Then OS 214 is either booted or, if it was previously paused, resumed on user device 101-2.

In another embodiment, OS 214 is able to work with a plurality of user devices such as, for example, user devices 101-1, 101-2 and 101-3. In order to enable this, in an embodiment communications module 213 is able to establish and simultaneously maintain connections 201-1, 201-2 and 201-3 with user devices 101-1, 101-2 and 101-3 respectively. Then, user devices 101-1, 101-2 and 101-3 are simultaneously connected to the device interoperability system 200 and each one of these user devices runs its instance of OS 214 in parallel with each other. In one embodiment, the transmission capacity of communications module 213 is balanced between connections 201-1, 201-2 and 201-3 according to the current utilization of each connection.

In a further embodiment, different instances of OS 214 which are simultaneously running on user devices 101-1, 101-2 and 101-3 use the distributed lock management approach to coordinate concurrent access to the storage 212. For example, the lock managers of all three instances of OS 214 which are running on the user devices 101-1, 101-2 and 101-3, use the same lock database which is distributed among these instances by means of device interoperability system 200 and connections 201-1, 201-2 and 201-3.

In one embodiment, the interoperability system 200 is used by the different instances of OS 214 which are simultaneously running on different user devices to exchange some details about their current status. This, for example, includes:

number and device types of simultaneously working user devices,
status of important OS service functions, for example, an OS update process,
current user activity, and
currently running applications.

This data is used by every running instance of OS 214 to coordinate and optimize its service functions. For example, when three instances of OS 214 are running on user devices 101-1, 101-2 and 101-3, coordination is performed to ensure that the OS update process is not running simultaneously on all three devices. In a further embodiment, this data is used to prioritize the balancing of the transmission capacity of communications module 213 between established connections 201-1 to 201-3. For example, a higher priority is given to that user device which user 100 currently uses.

In yet another embodiment, the OS 214 supports migration of running applications between OS instances running on different user devices. With reference to the example above, OS 214 supports the ability to move a currently running application from user device 101-2 to user device 101-3. After the migration, the application continues to have access to any previously opened files. In a further embodiment, the data described previously is used to present more details to a user if the user opts to migrate applications and the connections 201-2 and 201-3 are used to facilitate the migration process.

The use of device interoperability system 200 offers several other advantages. In some embodiments, device interoperability system 200 is used in conjunction with cloud-based data synchronization capabilities. For example, if cloud-based services are used for synchronization of data between different user devices, device interoperability system 200 reduces the necessity for user devices to connect to the cloud to perform data synchronization. Instead, the user devices use data from storage 212. This reduces the utilization of the cloud connection with the user devices. Furthermore, in some embodiments, the device interoperability system 200 ensures data availability in case cloud connectivity is lost or not available, as the user devices can retrieve data from storage 212. In some embodiments, intelligent approaches to ensuring availability of data which is most likely to be relevant to a user are employed. These include, for example, approaches based on:

Temporal locality: Data which was most recently used on a user device is stored on storage 212 as it is likely that the user device will use this data again in the near future.
Spatial locality: Data sets which occupy memory locations close to recently used data are stored on storage 212 as it is likely that the user device will use these data sets in the near future.

Branch locality: In cases where there are multiple possible outcomes from conditional branching instructions, then data related to each of these outcomes are stored on storage 212 as it is likely that the user device will use this data.

Probabilistic analysis of user interactions with user devices: For example, if there is a high probability that a user will use one or more data sets either in conjunction with or after using a particular program, then these data sets are stored on storage 212.

In some embodiments, some user data is stored on storage 212 but not within the cloud. This capability is useful if, for example, users want to keep control of sensitive data.

On its own, the feature of storing some user data within local storage and not in the cloud has been implemented in, for example, the Samsung Galaxy S10. The Samsung Galaxy S10 is built with the new defence-grade proprietary Samsung Knox platform, and has secure storage backed by hardware to house private keys for blockchain-enabled mobile services, as discussed in, for example, https://news-samsung.com/global/samsung-raises-the-bar-with-galaxy-s10-more-screen-cameras-and-choices, retrieved Mar. 20, 2019. This feature enables Samsung Galaxy S10 users to keep control of their private keys rather than exposing it to potential security breaches in the cloud.

The security of this feature is enhanced by the addition of device interoperability system 200. In particular, this enhancement is achieved by running device interoperability system 200 on a device or gadget where storage 212 has these secure storage capabilities, and allowing only user devices that are connected to device interoperability system 200 and have been booted up using OS 214 to access the data stored within storage 212. As will be seen below, this enables the creation of a more secure and private ecosystem.

For example: In the case where private keys for blockchain-enabled mobile services are stored on storage 212, only user devices that are connected to device interoperability system 200 and have been booted up using OS 214 are able to access these private keys. This is useful, for example, to ensure that the user is able to securely perform cryptocurrency transactions.

Sensitive data can be further secured through other means. For example, in some embodiments, as explained previously, the sensitive user data is encrypted prior to being stored in storage 212. In some of these embodiments, the user selects the type of encryption to be used.

In other embodiments, sensitive user data is not accessible directly to user devices that have been connected to device interoperability system 200 and have been booted up using OS 214. Instead, only the results of processing or operations performed by, for example, one or more programmes which are part of programmes and data 216 residing on storage 212 and which uses the sensitive data, are made available to the user devices. For example, if the user using user device 101-3 wants to perform cryptocurrency transactions and needs to access private keys to sign transactions, then the transactions which require signing are transmitted from the user device 101-3 over connection 201-3 to the device interoperability system 200. At device interoperability system 200, the transactions are signed using one or more programmes resident on storage 212. The signed transactions are then transmitted back over connection 201-3 to the user device 101-3. This way, user device 101-3 does not access the sensitive user data at all.

In some embodiments, the availability of the sensitive user data or the results of processing or operations which use the sensitive data is based on a security level associated with the user device. This is illustrated with reference to user device 101-3. For example, in some embodiments, the user device 101-3 is considered to have a low security level if it is publicly accessible. If user device 101-3 is only privately accessible and access is secured using, for example, two authentication factors as described previously, it is considered to have a very high security level.

Figure 5:
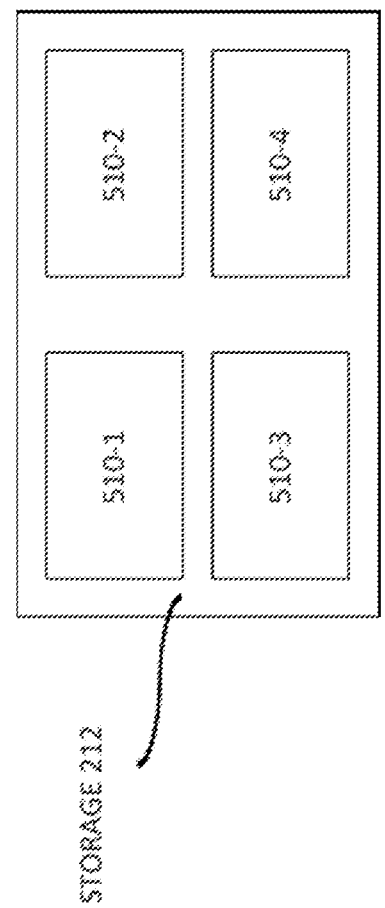
FIG. 5 illustrates an example embodiment of different storage sub-areas, each having different associated security levels.

In some embodiments, storage 212 comprises several storage sub-areas, wherein each sub-area has a different associated security level. An example embodiment is shown in FIG. 5, where storage 212 comprises one or more sub-areas 510-1 to 510-4. Then, for example:

Sub-area 510-1 has the highest level of security,
Sub-area 510-2 has the second highest level of security,
Sub-area 510-3 has the third highest level of security, and
Sub-area 510-4 has the lowest level of security.

The Samsung Galaxy S10 is an example of this, as it has a secure storage sub-area to store private keys for blockchain-enabled mobile services and a less secure storage sub-area. This can also be used to differentiate the level of access of a user device to data. For example:

the most sensitive data is stored in the most secure storage sub-area,
the next most sensitive data is stored in the next most secure storage sub-area, and so on.

The implementation of sub-areas within storage 212 into sub-areas can be carried out in a variety of ways. In some embodiments, the implementation is performed physically, that is, each sub-area corresponds to a different physical storage area. In some embodiments, the implementation is performed virtually, that is, a physical storage area is partitioned into different sub-areas. In yet other embodiments, a combination of virtual and physical implementations is used.

In some embodiments, the above concepts are combined to create a hierarchical or differentiated system of secure storage for a user's data. This hierarchy has a plurality of levels, wherein each level of the hierarchy corresponds to a different level of data sensitivity and therefore required security.

Figure 6:
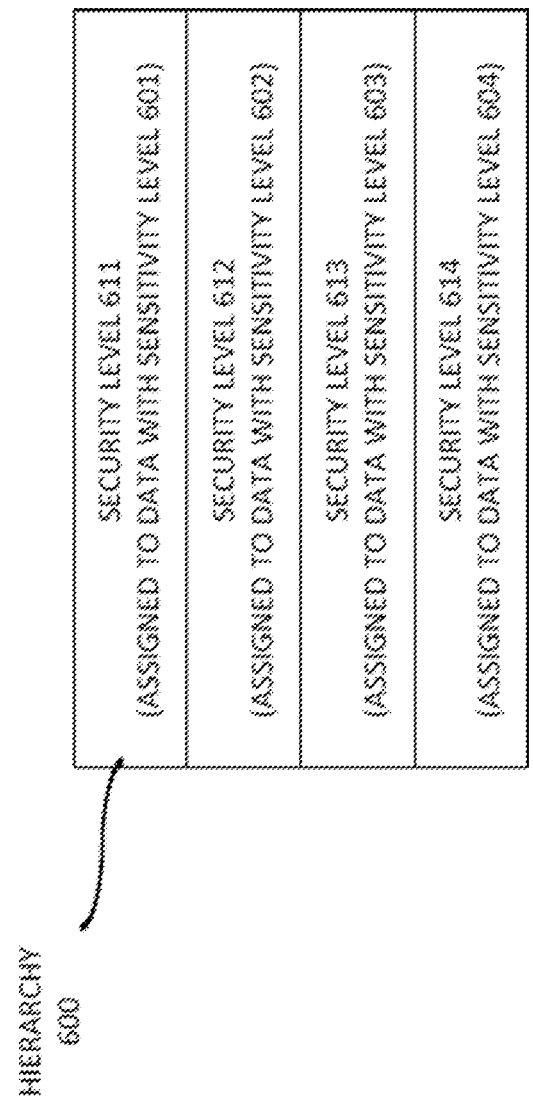
FIG. 6 illustrates an example embodiment of a hierarchy of secure storage for a user's data.

FIG. 6 shows an example embodiment of such a hierarchy 600. In hierarchy 600, Sensitivity level 601 corresponds to the user's most sensitive data, and the highest level of security 611 is assigned to data with sensitivity level 601.
Sensitivity level 602 corresponds to the user's second most sensitive data, and the second highest level of security 612 is assigned to data with sensitivity level 602.
Sensitivity level 603 corresponds to the user's third most sensitive data, and the third highest level of security 613 is assigned to data with sensitivity level 603, and
Sensitivity level 604 corresponds to the user's least sensitive data, and the lowest level of security 614 is assigned to data with sensitivity level 604.

Then the accessibility to the data is based on the security level which has been assigned to the data. An example of this is demonstrated below with reference to FIGS. 5 and 6. For example:

Data with security level 611 is not accessible to user devices and is stored in storage sub-area 510-1. The results of processing or operations which use the data are accessible to a user device, if
the user device has been connected to device interoperability system 200, the user device was booted by OS 214, and the security level associated with the user device is very high;

Data with security level 612 is stored in storage sub-area 510-2. It is accessible to a user device, if the user device has been connected to device interoperability system 200, the user device was booted by OS 214, and the security level associated with the user device is high;

Data with security level 613 is stored in storage sub-area 510-3. It is accessible to a user device if the user device has been connected to device interoperability system 200, the user device was booted by OS 214, and the security level associated with the user device is medium; and Data with security level 614 is stored in the cloud.

User data can be assigned to one of sensitivity levels 601-604 using different techniques. In some embodiments, assignment is based on user inputs on a user interface presented to the user at a user device. The user interface is, for example, a GUI. An example embodiment is as follows: A user assigns data to one of the levels by selecting a sensitivity setting of Very High, High, Medium, Low corresponding to levels 601-604. Then, based on this setting, one of the security levels described above is assigned to the data.

In other embodiments, user data is assigned to one of levels 601-604 based on the type of data. For example, sensitivity level 601 may be assigned to data related to an ultra-secure cryptocurrency "cold wallet" such as cryptocurrency, public and private keys as well as signing private keys for cryptocurrency transactions. Sensitivity level 602 may be assigned to user Personal Identification Numbers (PINs) and passwords for financial applications. Sensitivity level 603 is assigned to user media files that the user has indicated are sensitive. Finally, sensitivity level 604 is assigned to other user data which the user has allowed many cloud-based applications to use.

The above shows an embodiment where one level of security is assigned based on the sensitivity level of the data. In some embodiments, more than one level of security to be assigned based on the sensitivity level of the data. In some of these embodiments, based on the sensitivity level of the data, a minimum level of security is assigned. Then, any level of security either at or above that minimum level can be assigned to the data. For example, the minimum level for data with sensitivity level 602 is set to security level 612. Therefore, security levels 611 and 612 can be assigned to the data. Similarly, the minimum level for data with sensitivity level 603 is set to security level 613. Then security levels 611, 612 and 613 can be assigned to that data.

The above embodiments enable the creation of a secure, private ecosystem where sensitive data is stored within storage 212 of device interoperability system 200, and only devices which connect to device interoperability system 200 and are booted by OS 214 can access this data. Furthermore, the above details embodiments for a hierarchical or differentiated system of secure storage.

The use of device interoperability system 200 also offers advantages for IoT-enabled user devices. Similar to as with cloud-based services, device interoperability system 200 reduces the need to connect to the cloud to perform data synchronization. Furthermore it reduces the difficulty of having to maintain separate cloud credentials and device settings for user devices.

The hierarchical or differentiated system of secure storage mentioned above is of particular importance for IoT-enabled devices, as many of these devices are publicly accessible and may be difficult to monitor, thereby reducing the level of security associated with these devices. By using a hierarchical or differentiated system of secure storage, such devices can be used as part of a secure and private ecosystem without jeopardizing the overall level of security and privacy of the ecosystem.

It is also possible to perform data restore in the event of damage or loss of the device where device interoperability system 200 is installed. As previously described, in some embodiments OS 214 backs up data from storage 212 to a portion of each local storage space corresponding to each of the user devices connected to device interoperability system 200. Embodiments to perform caching were also previously described above. Then, in some embodiments, OS 214 uses the data stored in the one or more caches corresponding to the user devices connected to device interoperability system 200, in conjunction with the data backed up on a portion of the local storage space of the user devices connected to device interoperability system 200, to perform a data restore.

Figure 7A:
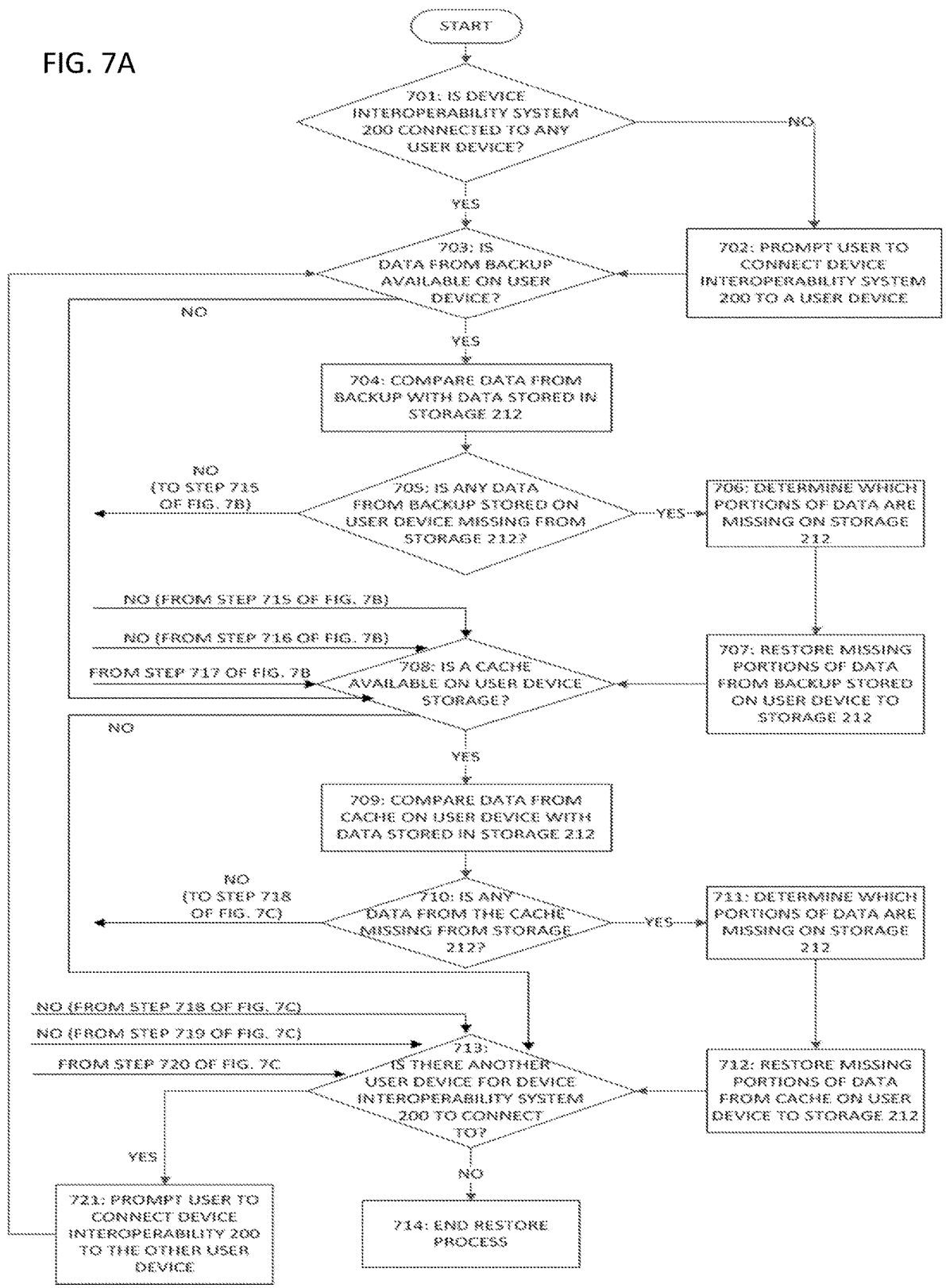
FIG. 7A illustrates part of an example embodiment of a data restore process.
Figure 7B:
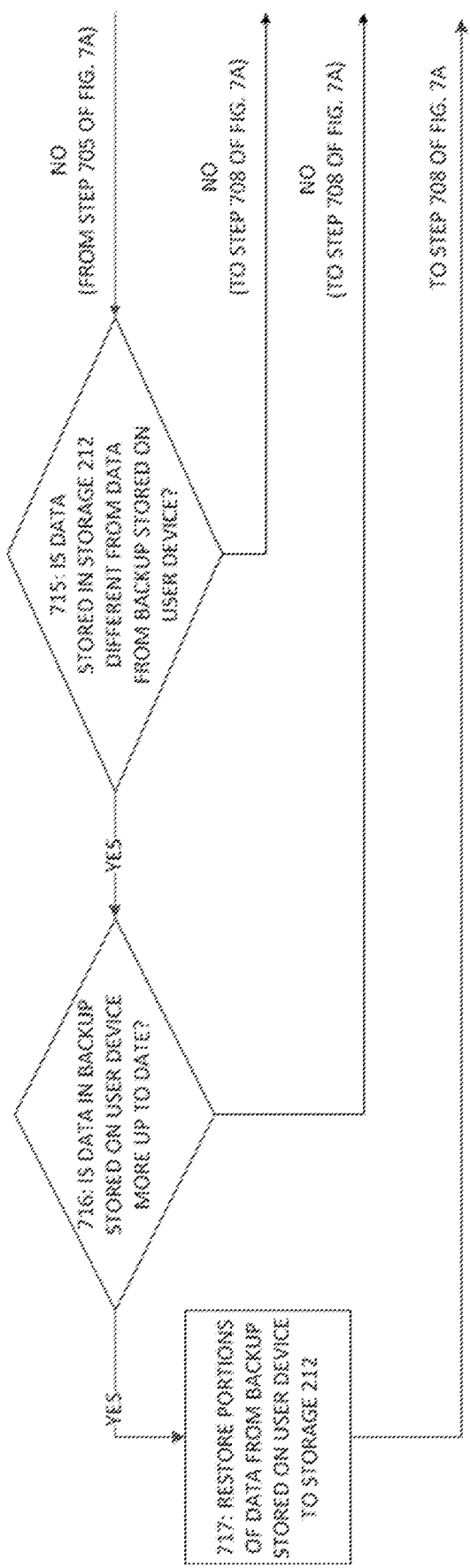
FIG. 7B illustrates part of an example embodiment of a data restore process.
Figure 7C:
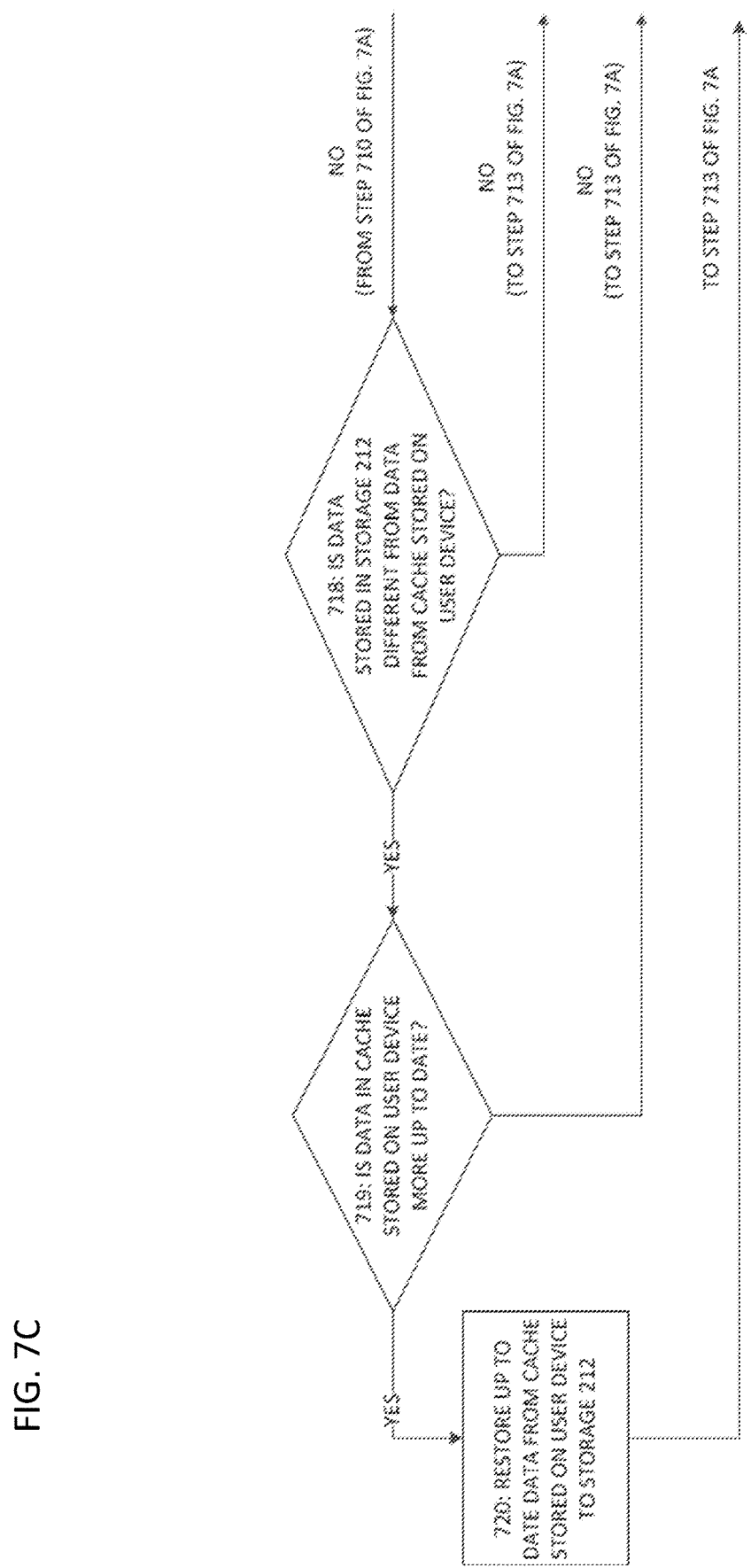
FIG. 7C illustrates part of an example embodiment of a data restore process.

FIGS. 7A-7C illustrate an exemplary embodiment of a data restore process performed by OS 214 which uses the data stored in the one or more caches and the data backed up on the user devices to perform a data restore. In step 701, OS 214 checks to see if device interoperability system 200 is connected to any of the user devices. If no, then in step 702, the user is prompted to connect device interoperability system 200 to a user device. If device interoperability system 200 is connected to a user device, or after connection to a user device in step 702, then in step 703 OS 214 checks to see if data from a previous backup operation is available on the user device. If yes, then in step 704, OS 214 compares data from the backup with data stored in storage 212. If no, then OS 214 progresses to step 708 which will be explained further below.

Once step 704 is completed, in step 705 OS 214 determines if any data from the backup stored on the user device is missing from storage 212. If yes, then in step 706 OS 214 determines the data which is missing from storage 212. Once step 706 is completed, then data is restored from the backup on the user device to storage 212 in step 707.

If in step 705 OS 214 determines that there is no data from the backup on the user device missing from storage 212, then in step 715 of FIG. 7B OS 214 determines if the data from the backup on the user device is different to the data stored on storage 212. If in step 715, OS 214 determines that there is no difference, then OS 214 progresses on to step 708 of FIG. 7A. If OS 214 determines that there is a difference, then in step 716 OS 214 determines whether the data in the backup stored on the user device is more up to date than the data stored in storage 212. If the data in the backup stored on the user device is less up to date, then OS 214 progresses on to step 708 of FIG. 7A. If the OS 214 determines in step 716 that the data in the backup stored on the user device is more up to date, then OS 214 restores the up to date data from the backup to storage 212. Once step 717 is completed, OS 214 progresses to step 708 of FIG. 7A.

In step 708, OS 214 determines if there is a cache available on the user device storage. If there is no cache available, then OS 214 progresses to step 713 which will be explained further below. If there is a cache available, then in step 709 OS 214 compares data from the cache with the data stored in storage 212 to see if there is data present in the cache which is missing from storage 212. In one embodiment, the cache service database which is stored on the user device is used to determine if there is data present on the cache which is missing from storage 212 in step 709. If OS 214 determines in step 710 that there is data missing, then in step 711, OS 214 determines which portions of data are missing on storage 212. Once step 711 is completed, then in step 712 OS 214 restores the missing portions of data from the cache to storage 212. OS 214 then progresses to step 713.

If OS 214 determines in step 710 that there is no data missing, then in step 718 of FIG. 7C, OS 214 determines if the data stored in storage 212 is different from the data from the cache stored on the user device. In some embodiments, the cache service database which is stored on the user device is used to determine if the data present on the cache is different from the data stored on storage 212 in step 718. If there is no difference, then OS 214 progresses to step 713 of FIG. 7A. If there is a difference, then in step 719 OS 214 determines if the data stored in the cache is more up to date than the data stored in storage 212. If the data stored in the cache is less up to date, then OS 214 progresses to step 713. If it is more up to date, then in step 720 OS 214 restores the up to date data from the cache to storage 212. Once step 720 is completed, OS 214 progresses to step 713 of FIG. 7A.

In step 713 of FIG. 7A, OS 214 determines if there is another user device for device interoperability system 200 to connect to. If there is another user device available for connection, then OS 214 prompts the user to connect device interoperability system 200 to the other user device in step 721. After completing step 721, OS 214 returns to perform step 703. If there is no other user device available, then OS 214 stops the restore process in step 714.

Variations on the above are also possible. For example, in some embodiments, only data stored in the cache is used by OS 214 for data restore. An exemplary embodiment is illustrated with reference to FIGS. 8A and 8B. In step 801, similar to step 701, OS 214 checks to see if device interoperability system 200 is connected to any of the user devices. If no, then in step 802, similar to step 702, OS 214 prompts the user to connect device interoperability system 200 to a user device. If device interoperability system 200 is connected to a user device, or after connection to a user device in step 802, then in step 808 OS 214 determines if there is a cache available on the user device storage, similar to previously disclosed step 708, If there is no cache available, then OS 214 progresses to step 813 which is similar to step 713. If there is a cache available, then in step 809 (similar to step 709) OS 214 compares data from the cache with the data stored in storage 212 to see if there is data present in the cache which is missing from storage 212. In one embodiment, the cache service database which is stored on the user device is used to determine if there is data present on the cache which is missing from storage 212 in step 809. If OS 214 determines in step 810 (similar to step 710) that there is data missing, then in step 811 (similar to step 711), OS 214 determines which portions of data are missing on storage 212. Once step 811 is completed, then in step 812 (similar to step 712) OS 214 restores the missing portions of data from the cache to storage 212. OS 214 then progresses to step 813.

Figure 8A:
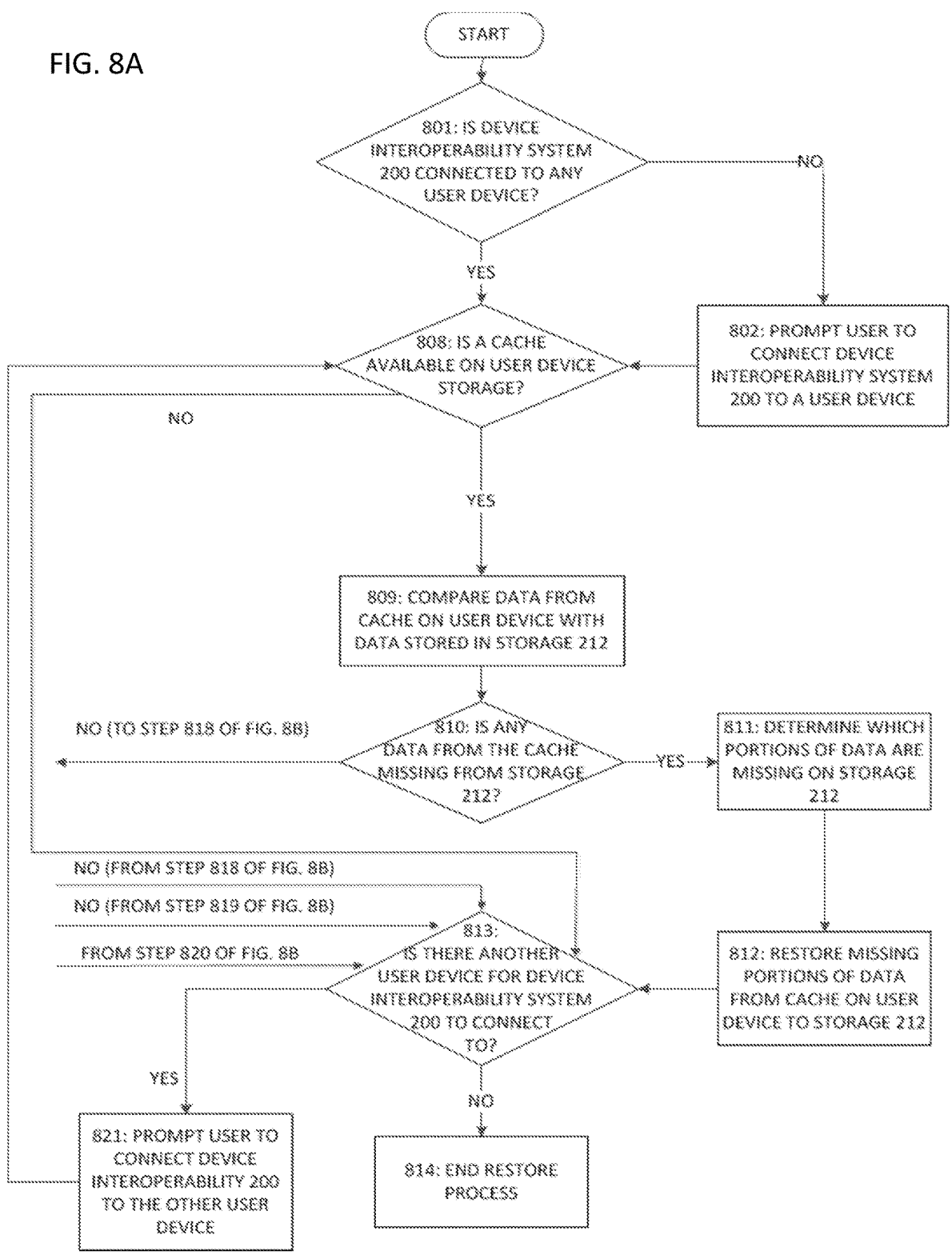
FIG. 8A illustrates part of an example embodiment of a data restore process where only data stored in a cache is used for data restore.
Figure 8B:
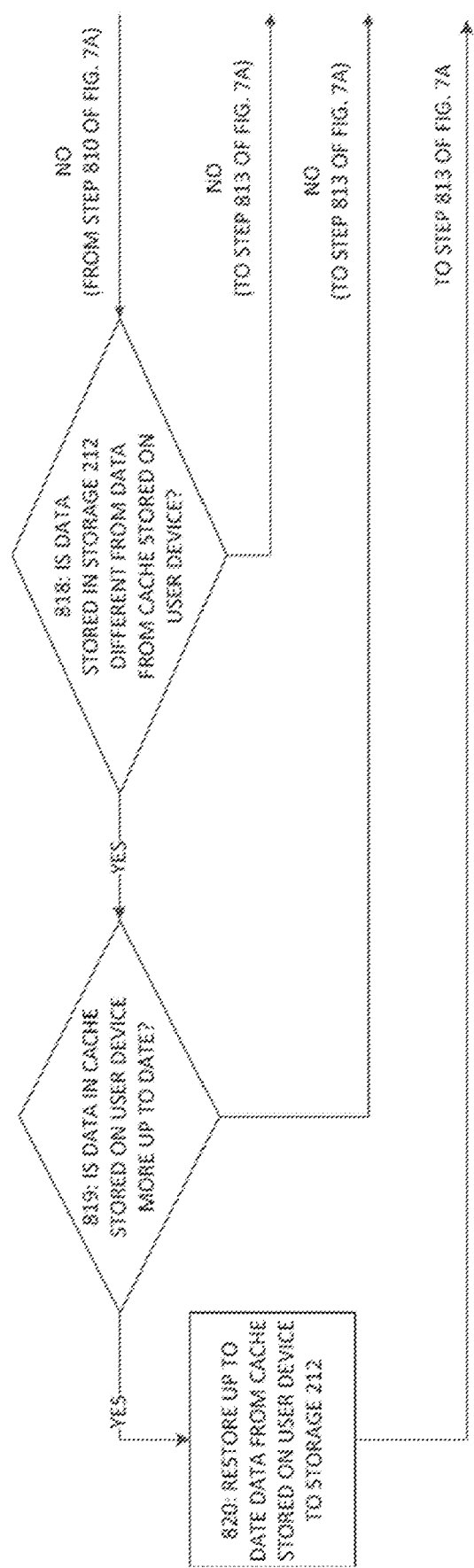
FIG. 8B illustrates part of an example embodiment of a data restore process where only data stored in a cache is used for data restore.

If OS 214 determines in step 810 that there is no data missing, then in step 818 (similar to step 718 of FIG. 7C) of FIG. 8B, OS 214 determines if the data stored in storage 212 is different from the data from the cache stored on the user device. In some embodiments, the cache service database which is stored on the user device is used to determine if the data present on the cache is different from the data stored on storage 212 in step 818. If there is no difference, then OS 214 progresses to step 813 of FIG. 8A. If there is a difference, then in step 819 (similar to step 719 of FIG. 7C) OS 214 determines if the data stored in the cache is more up to date than the data stored in storage 212. If the data stored in the cache is less up to date, then OS 214 progresses to step 813. If it is more up to date, then in step 820 (similar to step 720 of FIG. 7C) OS 214 restores the up to date data from the cache to storage 212. Once step 820 is completed, OS 214 progresses to step 813 of FIG. 8A.

In step 813 of FIG. 8A, OS 214 determines if there is another user device for device interoperability system 200 to connect to. If there is another user device available for connection, then OS 214 prompts the user to connect device interoperability system 200 to the other user device in step 821 (similar to step 721). After completing step 821, OS 214 returns to perform step 808. If there is no other user device available, then OS 214 stops the restore process in step 814, similar as in what would have happened in step 714.

As previously explained and as shown in step 4C-04 of FIG. 4C, OS 214 selectively prefetches one or more portions of data stored in storage 212 which are different from the data stored in the cache of a user device, and the selection and prioritization of data depends on several factors. In additional embodiments, these factors include the previously discussed backup status associated with each portion of data.

In one embodiment, when a portion of the data is about to be deleted from the cache, an additional check of its backup status is performed by OS 214. For example, if there are no more copies of particular portion of the data stored on other user devices or at other backup locations then this portion of data will not be deleted from the cache.

Figure 9A:
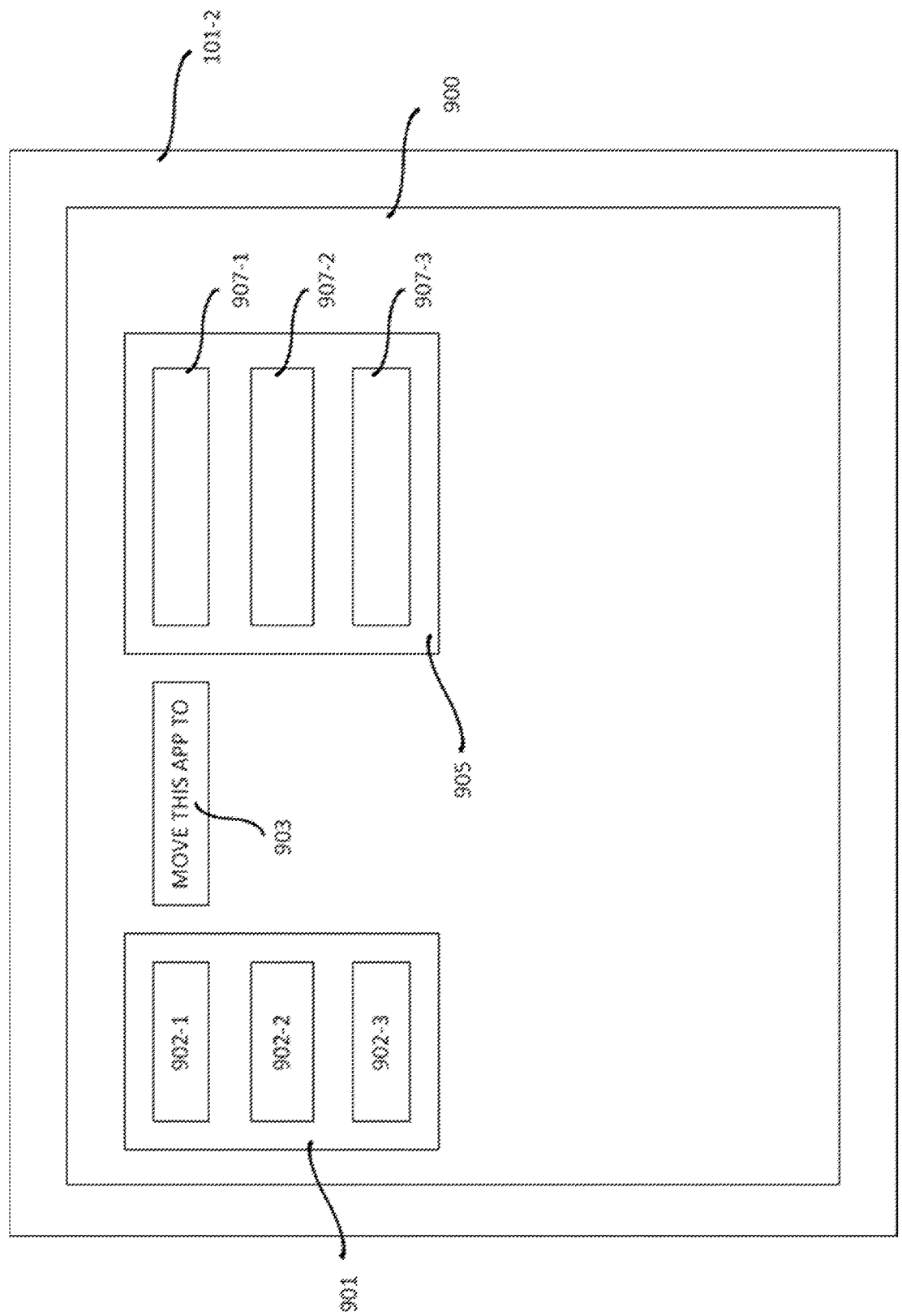
FIG. 9A illustrates an example embodiment of a graphical user interface (GUI) for a push-based application migration.
Figure 9B:
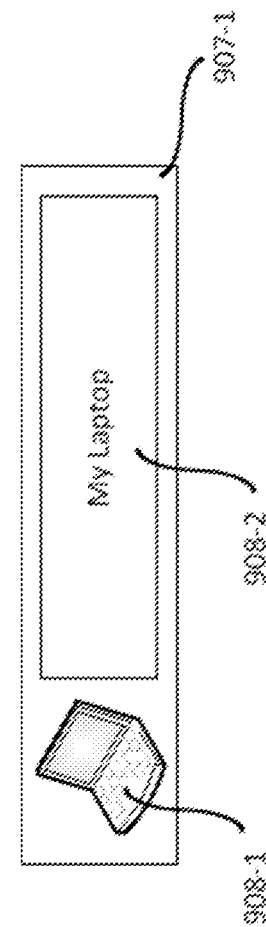
FIG. 9B illustrates an example embodiment of a GUI item corresponding to a user device for a push-based application migration.

As explained above, the OS 214 supports migration of running applications between OS instances running on different user devices. In some embodiments, migration is performed using a "push"-based technique, that is, where migration is initiated at a source user device, and an application is then pushed from the source device to a destination user device. In further embodiments, a GUI is generated on a source user device to allow the user to select an application for migration, and the destination user device to which the application will be migrated to. An exemplary illustration is shown in FIG. 9A. In FIG. 9A, GUI 900 shows a list of running applications 901 on the source user device 101-2. List of running applications 901 has entries 902-1 to 902-3, each corresponding to a running application. When any of these entries are selected, an option is presented to the user to enable the user to decide which destination device the application is to be migrated to. As shown in FIG. 9A, when an entry such as entry 902-1 is selected, option 903 with the prompt "MOVE THIS APP TO" is presented to the user, along with a list of connected user devices 905. List 905 comprises, for example, items 907-1 to 907-3, wherein each item corresponds to one of other user devices 101-3, 101-4 and 101-5 currently connected to the device interoperability system 200. In some embodiments, each item consists of an icon representing the type of the user device and the device name. For example, item 907-1 corresponds to user device 101-3 which is a laptop. An exemplary illustration of item 907-1 is shown in FIG. 9B. In FIG. 9B item 907-1 comprises icon 908-1 to represent a laptop, and name label 908-2 comprising, for example, "My Laptop".

Figure 10A:
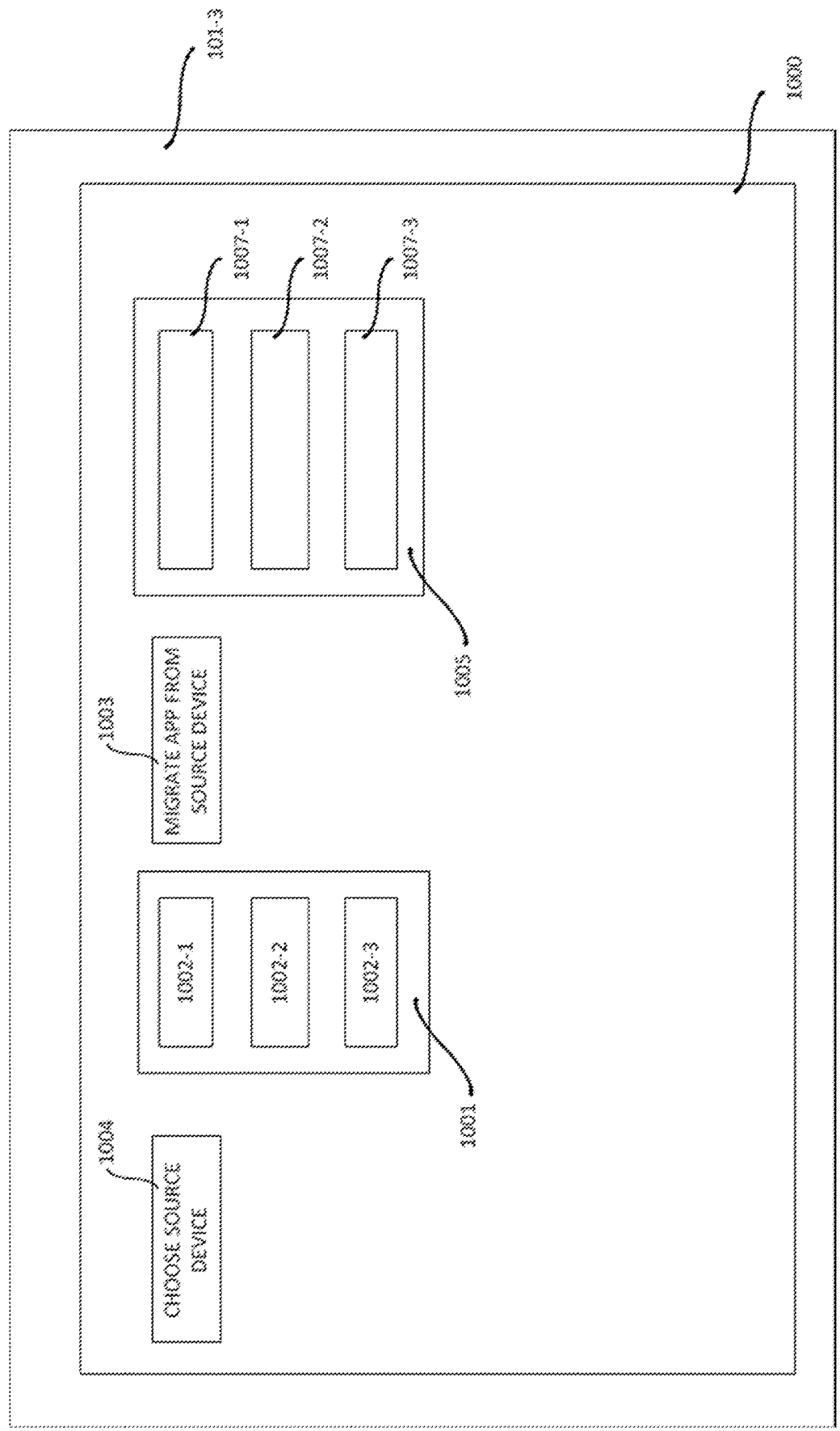
FIG. 10A illustrates an example embodiment of a GUI for a pull-based application migration.
Figure 10B:
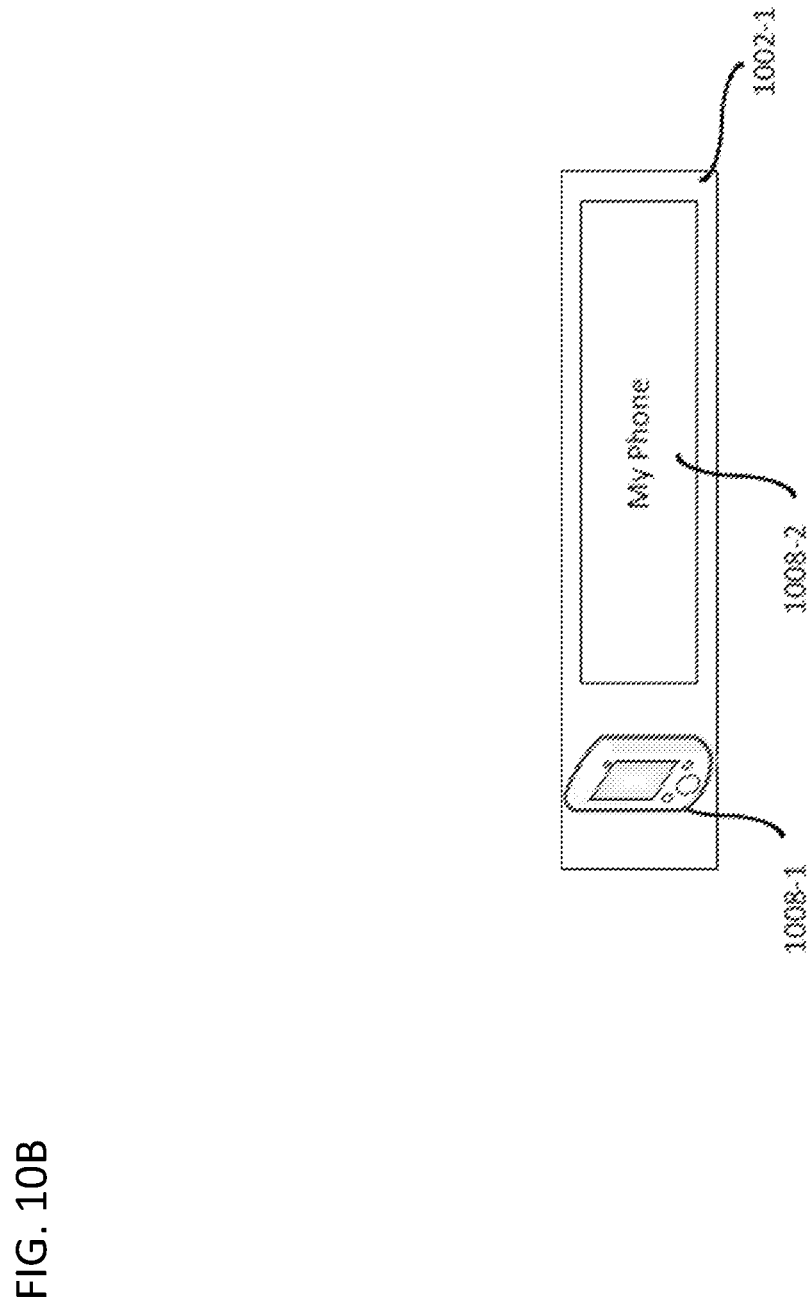
FIG. 10B illustrates an example embodiment of a GUI item corresponding to a user device for a pull-based application migration.

In some embodiments, migration is performed using a "pull"-based technique, that is, where migration is initiated at the destination user device, and an application is then pulled from a source user device for migration to the destination user device. In further embodiments, a GUI is generated on a destination user device to allow the user to select a source user device where an application will be migrated from, and an application for migration. An exemplary illustration is shown in FIG. 10A. In FIG. 10A, GUI 1000 presents an option 1004 with the prompt "CHOOSE A DEVICE", along with a list of source devices 1001. List of source user devices 1001 has entries 1002-1 to 1002-3, corresponding to source user devices 101-2, 101-4 and 101-5 connected to device interoperability system 200. In some embodiments, each entry comprises an icon representing the type of the user device and the device name. For example, entry 1002-1 corresponds to user device 101-2 which is a smartphone. An exemplary illustration of entry 1002-1 is shown in FIG. 10B. In FIG. 10B entry 1002-1 comprises icon 1008-1 to represent a phone, and name label 1008-2 comprising, for example, "My Phone". When any of these entries are selected, an option is presented to the user to enable the user to decide which running application should be migrated from the selected source user device. As shown in FIG. 10A, when an entry such as entry 1002-1 is selected, option 1003 with the prompt "MIGRATE APP FROM OTHER DEVICE" is presented to the user, along with a list of applications 1005 running on user device 101-2. List 1005 comprises, for example, items 1007-1 to 1007-3, wherein each item corresponds to one of the applications which are running on source user device 101-2.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A system to enhance usability of one or more user devices associated with a user, wherein:
   the one or more user devices comprise a first user device and a second user device, and the device interoperability system is installed on the second user device;
   the device interoperability system comprising:
      a communications module, wherein
         a first connection is established between the first user device and the communications module, further wherein
         the first connection is either wired or wireless,
      storage communicatively coupled to the communications module, wherein the storage stores
         an operating system,
         one or more programs,
         data associated with the user, further wherein
            the operating system is booted by the first user device via the first connection,
            the operating system runs on the first user device, and
            the operating system uses one or more processing capabilities of the first user device to operate, and
      one or more processors to perform one or more functions of supporting the device interoperability system.

2. The system of claim 1, wherein the first user device is either an industrial IoT device or a consumer IoT device.

3. The system of claim 1, wherein the second user device is a laptop.

4. The system of claim 1, wherein the first connection is a direct wired connection.

5. The system of claim 1, wherein the second user device is associated with a network of industrial devices.

6. The system of claim 1, wherein
   one or more UEFI settings are changed on the first user device; and
   based on the change of the one or more UEFI settings, the operating system is booted by the first user device.

7. The system of claim 1, wherein:
   the first user device has a first user device storage; and
   the device interoperability system uses the first user device storage to perform at least one of:
      caching,
      swapping,
      expanding storage, and
      backups.

8. The system of claim 1, wherein:
   the first user device has processing power and memory;
   the one or more programs comprise a first program; and
   the first program runs on the first user device using the first user device processing power and memory.

9. The system of claim 1, wherein the operating system:
identifies the first user device, and
determines whether the operating system has stored a configuration set corresponding to the first user device.

10. The system of claim 9, wherein
when the operating system determines that the operating system has stored the configuration set corresponding to the first user device, the operating system uses the configuration set; and
when the operating system determines that the operating system has not stored the configuration set corresponding to the first user device, the operating system installs one or more drivers automatically.

11. A method to enhance usability of one or more user devices associated with a user, the one or more user devices comprising a first user device; the method comprising
providing a device interoperability system comprising
a communications module,
storage communicatively coupled to the communications module, further wherein
the one or more user devices comprise a second user device, and
the device interoperability system is installed on the second user device;
enabling establishment of a first connection between the first user device and the communications module;
enabling the storage to store
an operating system,
one or more programs, and
data associated with the user;
enabling booting of the operating system by the first user device via the first connection; and
enabling the operating system to:
run on the first user device, and
use one or more processing capabilities of the first user device to operate.

12. The method of claim 11, wherein the first user device is either an industrial IoT device or a consumer IoT device.

13. The method of claim 11, wherein
the first user device has a display; and
the operating system uses the first user device display.

14. The method of claim 11, wherein the second user device is associated with a network of industrial devices.

15. The method of claim 11, wherein the method further comprises
the first user device switching between operating in a stand-alone mode and in an interoperability mode.

16. The method of claim 15, wherein the method comprises:
presenting an option to set up for interoperability mode; and
enabling the user to perform at least one of:
setting up authentication parameters,
setting up encryption parameters,
configuring a storage of the first user device for at least one of:
swapping,
caching,
backups, and
providing additional storage, and
saving a configuration set.

17. The method of claim 11, wherein:
the second user device comprises at least one of:
a second user device storage,
a second user device communications module, and
one or more second user device processors; and
the device interoperability system uses at least one of:
the second user device storage,
the second user device communications module, and
the one or more second user device processors for its operation.

18. The method of claim 11, wherein a graphical user interface (GUI) is generated on the first user device to enable the user to interface with the operating system.

19. The method of claim 11, wherein the operating system is used to boot up a third user device after being shut down on the first user device.

20. The system of claim 1, wherein one or more hardware components of the second user device are used by the operating system as external devices.

* * * * *